United States Patent
Park et al.

(10) Patent No.: US 11,368,737 B2
(45) Date of Patent: Jun. 21, 2022

(54) ELECTRONIC DEVICE FOR CREATING PARTIAL IMAGE AND OPERATION METHOD THEREOF

(71) Applicant: Samsung Electronics Co., Ltd., Suwon-si (KR)

(72) Inventors: Joo Hee Park, Suwon-si (KR); Dong Goo Kang, Suwon-si (KR); Pa Ra Kang, Suwon-si (KR); Soh Min Ahn, Suwon-si (KR); Eun Young Lim, Suwon-si (KR); Gul Ji Chung, Suwon-si (KR); Sang Chul Yi, Suwon-si (KR); Choul Jun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 15/733,099

(22) PCT Filed: Nov. 8, 2018

(86) PCT No.: PCT/KR2018/013501
§ 371 (c)(1),
(2) Date: May 15, 2020

(87) PCT Pub. No.: WO2019/098597
PCT Pub. Date: May 23, 2019

(65) Prior Publication Data
US 2020/0280752 A1 Sep. 3, 2020

(30) Foreign Application Priority Data
Nov. 17, 2017 (KR) .................. 10-2017-0153877

(51) Int. Cl.
*G06F 15/16* (2006.01)
*H04N 21/2743* (2011.01)
(Continued)

(52) U.S. Cl.
CPC ..... *H04N 21/2743* (2013.01); *H04N 21/2187* (2013.01); *H04N 21/25825* (2013.01)

(58) Field of Classification Search
CPC ........... H04N 21/2743; H04N 21/2187; H04N 21/8549
See application file for complete search history.

(56) References Cited

U.S. PATENT DOCUMENTS

| | | | |
|---|---|---|---|
| 7,788,336 B2 * | 8/2010 | Ebert .................. | G06Q 30/02 709/217 |
| 8,646,017 B2 * | 2/2014 | Amento ............... | H04N 21/252 725/120 |

(Continued)

FOREIGN PATENT DOCUMENTS

| | | |
|---|---|---|
| JP | 2002-142189 A | 5/2002 |
| KR | 10-0803747 B1 | 2/2008 |

(Continued)

OTHER PUBLICATIONS

International Search Report and Written Opinion of the International Searching Authority in connection with International Application No. PCT/KR2018/013501 dated Feb. 19, 2019, 13 pages.

(Continued)

*Primary Examiner* — Hieu T Hoang

(57) ABSTRACT

An electronic device, according to various embodiments, comprises: a communication unit; and a control unit, wherein the control unit may be configured to: receive, from one or more second electronic devices, via the communication unit, data regarding feedback on an image while transmitting the image that is received from a first electronic device to the one or more second electronic devices for displaying in the one or more second electronic devices; create a partial image for the one or more second electronic devices from the image on the basis of the data regarding the feedback; and provide the one or more second electronic (Continued)

| | FRAME NUMBER (910) | USER ID (CHAT MEMBER) (920) | FEEDBACK COORDINATE (930) | FEEDBACK TYPE (940) |
|---|---|---|---|---|
| | ⋮ | ⋮ | ⋮ | ⋮ |
| 901 → | FRAME 151 | @userA @userB | $(X_1, Y_1)$ $(X_2, Y_2)$ | Type 1: Profile image Type 1 |
| | ⋮ | ⋮ | ⋮ | ⋮ |
| 902 → | FRAME 200 | @userA @userB | $(X_3, Y_3)$ $(X_4, Y_4)$ | Type 2: Designated image Type 1 |
| | ⋮ | ⋮ | ⋮ | ⋮ |
| 903 → | FRAME m | @userA | $(X_5, Y_5)$ | Type 3: Drawing |
| | ⋮ | ⋮ | ⋮ | ⋮ |
| 904 → | FRAME n | @userB | - | Type 4: Text |

900 devices with the partial image as an image corresponding to a user's preference associated with the one or more second electronic devices.

12 Claims, 23 Drawing Sheets

(51) Int. Cl.
*H04N 21/2187* (2011.01)
*H04N 21/258* (2011.01)

(56) References Cited

U.S. PATENT DOCUMENTS

| | | | |
|---|---|---|---|
| 8,839,306 B2* | 9/2014 | Roberts | H04N 21/4438 725/60 |
| 9,077,956 B1* | 7/2015 | Morgan | H04N 9/87 |
| 9,171,578 B2* | 10/2015 | Lu | G11B 27/034 |
| 10,064,552 B1* | 9/2018 | Vaziri | H04N 9/8205 |
| 10,112,116 B2* | 10/2018 | Zhang | A63F 13/86 |
| 10,319,410 B1* | 6/2019 | Townsend | G11B 27/034 |
| 10,541,000 B1* | 1/2020 | Karakotsios | H04N 9/79 |
| 10,864,447 B1* | 12/2020 | Willette | H04N 21/44204 |
| 10,972,524 B1* | 4/2021 | Chambers | H04L 67/02 |
| 2004/0021685 A1 | 2/2004 | Denoue et al. | |
| 2006/0120624 A1* | 6/2006 | Jojic | G06F 16/739 382/284 |
| 2009/0112683 A1* | 4/2009 | Hamilton, II | G06Q 30/0203 705/7.32 |
| 2009/0164904 A1* | 6/2009 | Horowitz | G06F 16/78 715/723 |
| 2011/0177775 A1 | 7/2011 | Gupta et al. | |
| 2012/0242852 A1* | 9/2012 | Hayward | H04N 5/235 345/589 |
| 2012/0324491 A1 | 12/2012 | Bathiche et al. | |
| 2013/0305283 A1* | 11/2013 | Yoon | H04N 21/4788 725/37 |
| 2014/0049491 A1* | 2/2014 | Nagar | G06V 10/50 345/173 |
| 2015/0012840 A1* | 1/2015 | Maldari | H04N 21/658 715/748 |
| 2015/0070153 A1* | 3/2015 | Bhatia | G06F 3/016 340/407.1 |
| 2015/0104147 A1* | 4/2015 | Kosaka | G06F 16/4393 386/239 |
| 2015/0297949 A1* | 10/2015 | Aman | G06T 7/246 348/157 |
| 2015/0358650 A1* | 12/2015 | Kulkarni | H04N 21/274 386/239 |
| 2016/0361646 A1* | 12/2016 | Perry | A63F 13/497 |
| 2017/0032207 A1 | 2/2017 | Yoon et al. | |
| 2017/0054773 A1* | 2/2017 | Venolia | G06F 16/40 |
| 2017/0070779 A1* | 3/2017 | Kim | H04N 21/4825 |
| 2017/0150222 A1* | 5/2017 | Kim | H04N 21/482 |
| 2018/0018516 A1* | 1/2018 | Odinokikh | G06V 40/193 |
| 2018/0098117 A1 | 4/2018 | Kim et al. | |

FOREIGN PATENT DOCUMENTS

| | | |
|---|---|---|
| KR | 10-1181553 B1 | 9/2012 |
| KR | 10-2014-0014623 A | 2/2014 |
| KR | 10-1427711 B1 | 8/2014 |
| KR | 10-2017-0007849 A | 1/2017 |
| KR | 10-2017-0012979 A | 2/2017 |
| KR | 10-2017-0029933 A | 3/2017 |
| KR | 10-1721155 B1 | 4/2017 |

OTHER PUBLICATIONS

Korean Intellectual Property Office, "Notice of Preliminary Rejection" dated Feb. 15, 2022, in connection with Korean Patent Application No. 10-2017-0153877, 10 pages.

* cited by examiner ated based on the image shared between the plurality of electronic devices. For

ELECTRONIC DEVICE FOR CREATING PARTIAL IMAGE AND OPERATION METHOD THEREOF

CROSS-REFERENCE TO RELATED APPLICATIONS

This application is a 371 National Stage of International Application No. PCT/KR2018/013501, filed Nov. 8, 2018, which claims priority to Korean Patent Application No. 10-2017-0153877, filed Nov. 17, 2017, the disclosures of which are herein incorporated by reference in their entirety.

BACKGROUND

1. Field

Various embodiments relate to a method and device for generating a partial image from the full image.

2. Description of Related Art

With the development of digital technology, various electronic devices, such as mobile communication terminals, personal digital assistants (PDAs), electronic planners, smart phones, tablet personal computers (PCs), or wearable devices have become widespread. With the spread of various electronic devices, messenger applications executed through various electronic devices are also being developing. For example, via messenger applications installed in various electronic devices, various electronic devices may communicate with other electronic devices in which the messenger applications are installed. Various electronic devices may share various contents including video, voice, etc. with other electronic devices via the messenger applications. For example, various electronic devices may share various contents with other electronic devices via a server associated with the messenger applications.

SUMMARY

An electronic device may share an image acquired via the electronic device with other electronic devices. For example, the electronic device may transmit the image acquired via the electronic device to other electronic devices via a server so that other electronic devices may display the image in real time. The electronic device or the other electronic devices may acquire or reproduce the shared image after sharing of the image ends. Both the electronic device and the other electronic devices may acquire or reproduce the entire shared image after sharing of the image ends. Therefore, a plurality of users (e.g., users of the electronic device and other electronic devices) may all acquire or reproduce the same image. The plurality of users may feel bored due to watching an image that does not reflect the preference of each of the plurality of users. Therefore, it may be required to generate a partial image for each of the plurality of users, which reflects the preference of each of the plurality of users.

Various embodiments may provide a device and method for providing a partial image, which is obtained by extracting a meaningful section from the entire image, by generating the partial image from the shared image on the basis of feedback received from the plurality of electronic devices while the image is being shared between the plurality of electronic devices.

Various embodiments may provide the device and method for providing partial images, which are arranged in a meaningful order according to a type of the shared image, by generating the partial images from the shared image on the basis of the type of the image shared between the plurality of electronic devices.

Various embodiments may provide the device and method for providing partial images, which are personalized for the plurality of respective users, by generating the plurality of partial images for the plurality of respective electronic devices from the image shared between the plurality of electronic devices on the basis of user characteristics or user preferences of the plurality of electronic devices.

Technical tasks to be achieved in the document are not limited to the technical tasks mentioned above, and other technical tasks that are not mentioned may be clearly understood by those skilled in the art on the basis of the following descriptions.

An electronic device according to various embodiments may include a communication unit and a controller, wherein the controller is configured to: while an image received from a first electronic device is being transmitted to one or more second electronic devices so as to be displayed by the one or more second electronic devices, receive data relating to feedback on the image from the one or more second electronic devices via the communication unit; on the basis of the data relating to the feedback, generate partial images for the one or more second electronic devices from the image; and provide the one or more second electronic devices with the partial images as images corresponding to preferences of users related to the one or more second electronic devices.

A method for an electronic device according to various embodiments may include: while an image received from a first electronic device is being transmitted to one or more second electronic devices so as to be displayed by the one or more second electronic devices, receiving data relating to feedback on the image from the one or more second electronic devices; on the basis of the data relating to the feedback, generating partial images for the one or more second electronic devices from the image; and providing the one or more second electronic devices with the partial images as images corresponding to preferences of users related to the one or more second electronic devices.

An electronic device according to various embodiments may include a display, a communication module, and a processor, wherein the processor is configured to: while an image received from another electronic device via the communication module is being displayed via the display, detect data relating to feedback that is input by a user of the electronic device; transmit the data relating to the feedback to the another electronic device via the communication module; and on the basis of the data relating to the feedback, receive, from the another electronic device, a partial image relating to the image, which is generated by the another electronic device.

In a device and method according to various embodiments, in response to ending of sharing an image between a plurality of electronic devices, a partial image may be generated from the shared image.

In the device and method according to various embodiments, a partial image, which is obtained by extracting a meaningful section from the entire image, may be provided by generating the partial image from the shared image on the basis of feedback received from the plurality of electronic devices while the image is being shared between the plurality of electronic devices.

In the device and method according to various embodiments, partial images, which are arranged in a meaningful order according to a type of the shared image, may be provided by generating the partial images from the shared image on the basis of the type of the image shared between the plurality of electronic devices.

In the device and method according to various embodiments, partial images, which are personalized for the plurality of respective users, may be provided by generating the plurality of partial images for the plurality of respective electronic devices from the image shared between the plurality of electronic devices on the basis of user characteristics or user preferences of the plurality of electronic devices.

The effects obtainable in the disclosure are not limited to the above-mentioned effects, and other effects not mentioned may be clearly understood by those skilled in the art to which the disclosure belongs, from the descriptions below.

DETAILED DESCRIPTION

Figure 1:
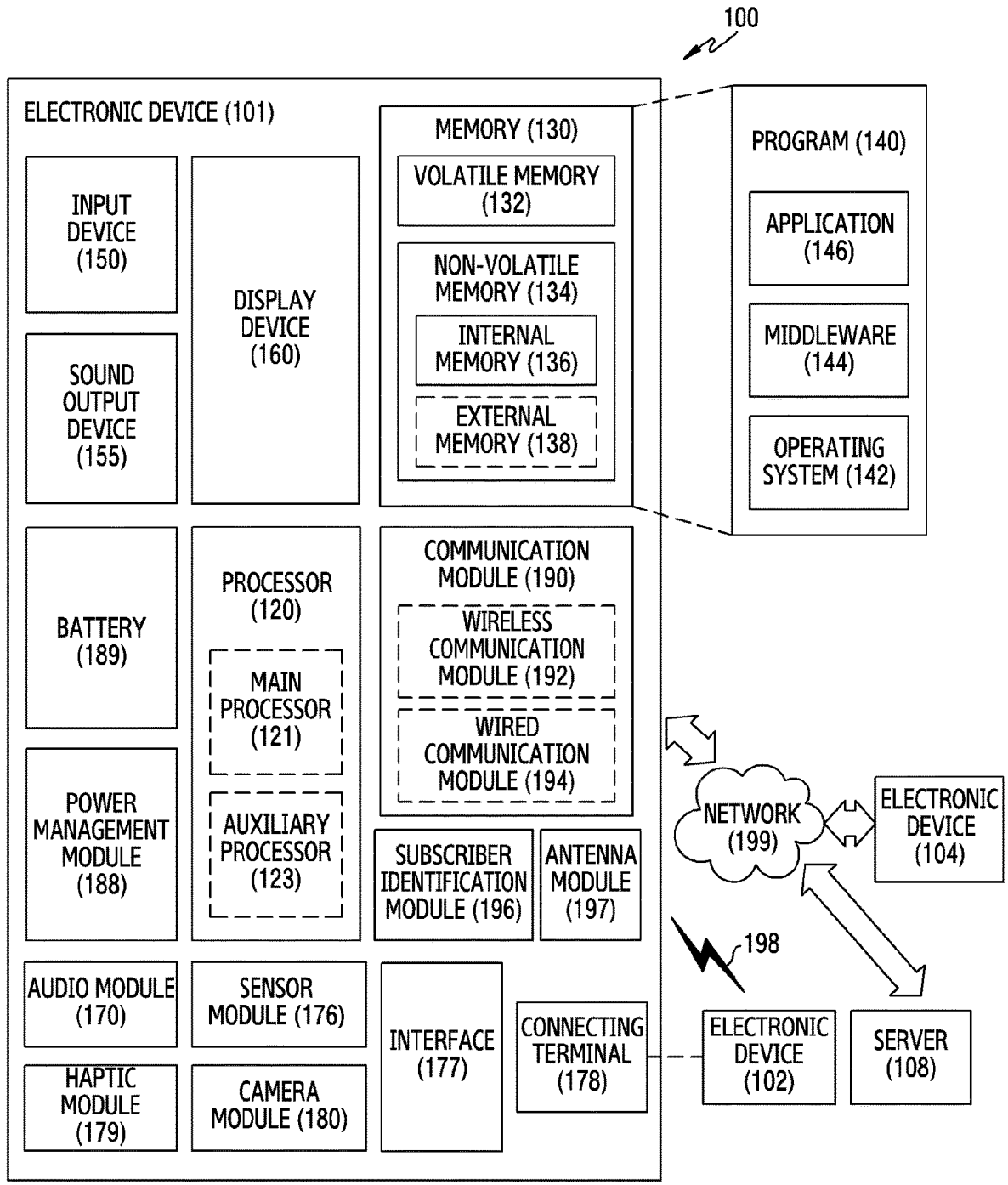
FIG. 1 is a block diagram of an electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
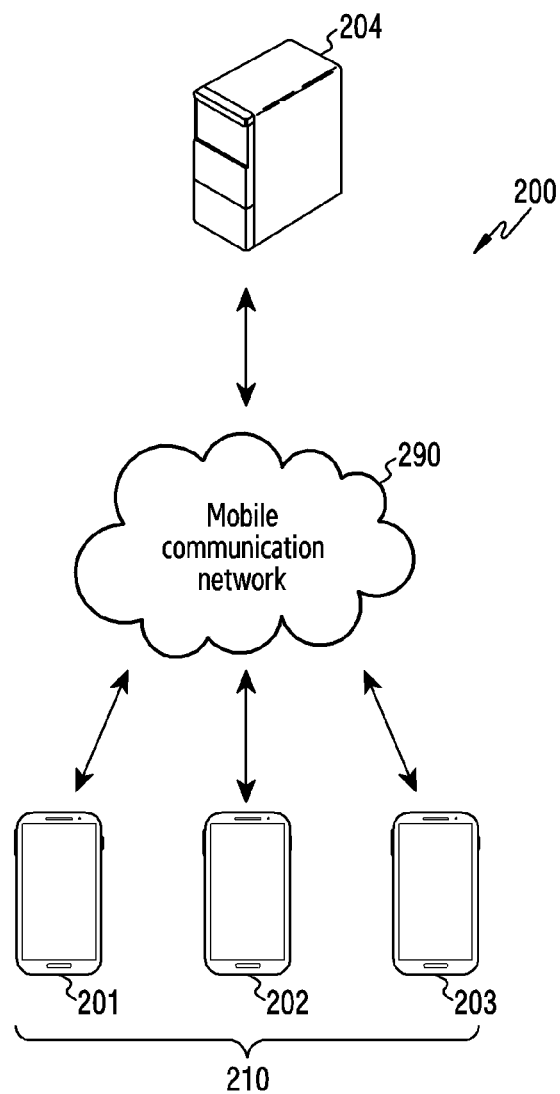
FIG. 2 illustrates an example of a network environment including a first electronic device, a second electronic device, a third electronic device, and a server according to various embodiments.

FIG. 2 illustrates an example of a network environment 200 including a first electronic device 201, a second electronic device 202, a third electronic device 203, and a server 204 according to various embodiments.

In FIG. 2, the first electronic device 201, the second electronic device 202, and the third electronic device 203 may correspond to the electronic device 101 of FIG. 1 (or the electronic device 102 and the electronic device 104). The server 204 may correspond to the server 108.

Referring to FIG. 2, the network environment 200 according to various embodiments may include the server 204 (e.g., the server 108) related to a messenger application and a plurality of electronic devices including the first electronic device 201, the second electronic device 202, and the third electronic device 203. The plurality of electronic devices may communicate with each other via the server 204 related to the messenger application by using a mobile communication network 290 (e.g., the first network 198 or the second network 199). For example, the plurality of electronic devices (e.g., the first electronic device 201, the second electronic device 202, and the third electronic device 203) may communicate with each other via the server 204 by using a messenger application which is stored in the plurality of electronic devices and provided by the server 204. According to embodiments, the server 204 related to the application may be replaced with a device other than a server or may include one or more servers according to functions.

The messenger application provided by the server 204 may include a rich communication suite (RCS) messenger application, a messenger application related to a social network service (SNS), or the like. The messenger application may provide an Internet protocol (IP)-based message (or content) transmission/reception service between the plurality of electronic devices. In some embodiments, the messenger application may be pre-stored in an electronic device (e.g., the electronic device 101, the first electronic device 201, the second electronic device 202, and the third electronic device 203). For example, the messenger application may be installed in the electronic device at a manufacturing stage in order to be provided by default in the electronic device. For example, the messenger application may be implemented by hardware or software, or a combination of hardware and software. In some other embodiments, the messenger application may be installed in the electronic device in the form of software according to selection by a user of the electronic device.

The first electronic device 201, the second electronic device 202, and the third electronic device 203 may be electronic devices included in one chat group 210 (conversation group) in the messenger application provided by the server 204. For example, the first electronic device 201, the second electronic device 202, and the third electronic device 203 included in one chat group 210 may be electronic devices included in one chat window in the messenger application.

The server 204 may provide a function related to the messenger application. The server 204 may store identification information relating to the chat group (e.g., chat window) in association with identification information relating to the plurality of electronic devices included in the chat group. For example, the server 204 may store IDs of the first electronic device 201, second electronic device 202, and third electronic device 203, which are included in the chat group 210, in association with an ID of the chat group 210. Although not illustrated, the server 204 may store information on the chat group 210 and information on a plurality of other chat groups.

The server 204 may control transmission/reception of contents (e.g., text data, audio data, moving image data, image data, etc.) between the plurality of electronic devices. In some embodiments, the server 204 may receive text data (e.g., text message) for the chat group 210 (e.g., chat window) via the mobile communication network 290 from the first electronic device 201. The server 204 may transmit the received text data to the second electronic device 202 and the third electronic device 203, which are the remaining electronic devices included in the chat group 210, via the mobile communication network 290 in response to reception of the text data as the contents. The server 204 may store the received text data in association with the ID of the chat group 210.

For example, the first electronic device 201 may transmit a content to the server 204 by using the mobile communication network 290 via the messenger application which is stored in the first electronic device 201 and is linked to the server 204. The first electronic device 201 may display the transmitted content in the chat window of the chat group 210 via a display (e.g., the display device 160) of the first electronic device 210.

For example, the second electronic device 202 may receive the content from the server 204 by using the mobile communication network 290 via the messenger application which is stored in the second electronic device 202 and is linked to the server 204. The second electronic device 202 may display the received content in the chat window of the chat group 210 via a display (e.g., the display device 160) of the second electronic device 202.

In various embodiments, the server 204 may provide a live casting function via the messenger application. Live casting (or real-time broadcasting) may indicate an operation of transmitting, in real time, an image acquired using a camera of one electronic device (i.e., an electronic device of a broadcaster) of the plurality of electronic devices to the remaining electronic devices (i.e., a participant electronic device or a viewer electronic device) so that the remaining electronic devices may display the acquired image in real time.

In various embodiments, the first electronic device 201 may be an electronic device related to a broadcaster performing live casting within the chat group 210 (e.g., chat window) of the messenger application. The second electronic device 202 may be an electronic device related to a participant (or a viewer) who is included in the chat group 210 and watches the live casting. The third electronic device 203 may be an electronic device related to a non-participant (or a non-viewer) who is included in the chat group 210 and does not watch the live casting.

Although not illustrated, in various embodiments, the chat group 210 may include electronic devices of a plurality of participants and electronic devices of a plurality of non-participants. The second electronic device 202 may be referred to as a representative of the electronic devices (e.g., a second electronic device-1, a second electronic device-2, etc.) of the plurality of participants. The third electronic device 203 may be referred to as a representative of the electronic devices (e.g., a third electronic device-1, a third electronic device-2, etc.) of the plurality of non-participants.

The first electronic device 201 (i.e., the electronic device of the broadcaster) may perform live casting within the chat group 210 (e.g., chat window) of the messenger application. The first electronic device 201 may transmit image data of an image acquired using a camera of the first electronic device 201 to the server 204 in real time by using the mobile communication network 290. The server 204 may transmit the image data received from the first electronic device 201 to the second electronic device 202, which is watching live casting, in real time using the mobile communication network 290.

The second electronic device 202 (i.e., the participant electronic device) may receive, from the server 204, the image data, which is received from the first electronic device 201, in real time via the mobile communication network 290. The second electronic device 202 may display the image data received from the server 204, via the display (e.g., the display 160) of the electronic device 202 in real time. A user (i.e., participant) of the second electronic device 202 may input feedback on live casting via the second electronic device 202 while watching the live casting. The second electronic device 202 may transmit data on the input feedback (hereinafter, feedback data) to the server 204.

The third electronic device 203 (i.e., non-participant electronic device) may be included in the chat group 210, but may not receive image data relating to the live cast from the server 204.

The server 204 may generate summary image data for the live casting in response to termination of the live casting. The server 204 may generate summary image data on the basis of the feedback data received from the second electronic device 202. The server 204 may transmit the generated summary image data to the first electronic device 201, the second electronic device 202, and/or the third electronic device 203. For example, the server 204 may transmit the summary image data to the first electronic device 201, the second electronic device 202, and/or the third electronic device 203 via the messenger application (e.g., the chat window of the chat group 210) provided by the server 204.

In various embodiments, users of the electronic devices included in the chat group 210 (e.g., chat window) may or may not watch a live cast depending on selection. That is, the electronic devices included in the chat group 210 may or may not receive live casting of the first electronic device 201 depending on user inputs.

Roles of the first electronic device 201, second electronic device 202, and third electronic device 203 (i.e., a broadcaster, a participant, and non-participant) as described above are merely an example for describing various embodiments, but are not limited thereto. Any of the plurality of electronic devices included in the chat group 210 may be a broadcaster performing live casting via the messenger application, a participant watching live casting via the messenger application, or a non-participant watching no live casting via the messenger application.

Figure 3:
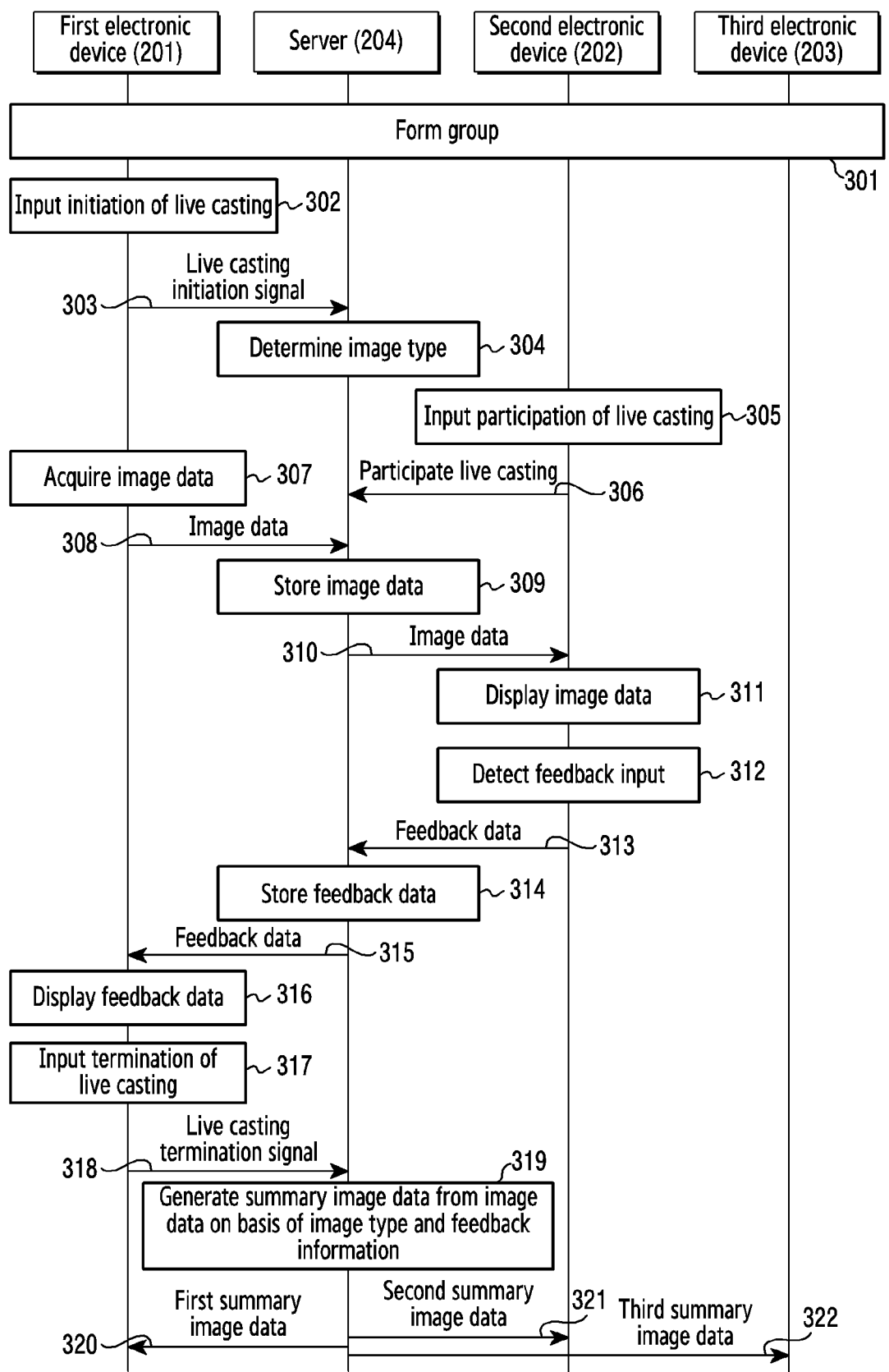
FIG. 3 illustrates an example of a signal flow between the first electronic device, the second electronic device, the third electronic device, and the server according to various embodiments.

FIG. 3 illustrates an example of a signal flow between the first electronic device 201, the second electronic device 202, the third electronic device 203, and the server 204 according to various embodiments.

Figure 4:
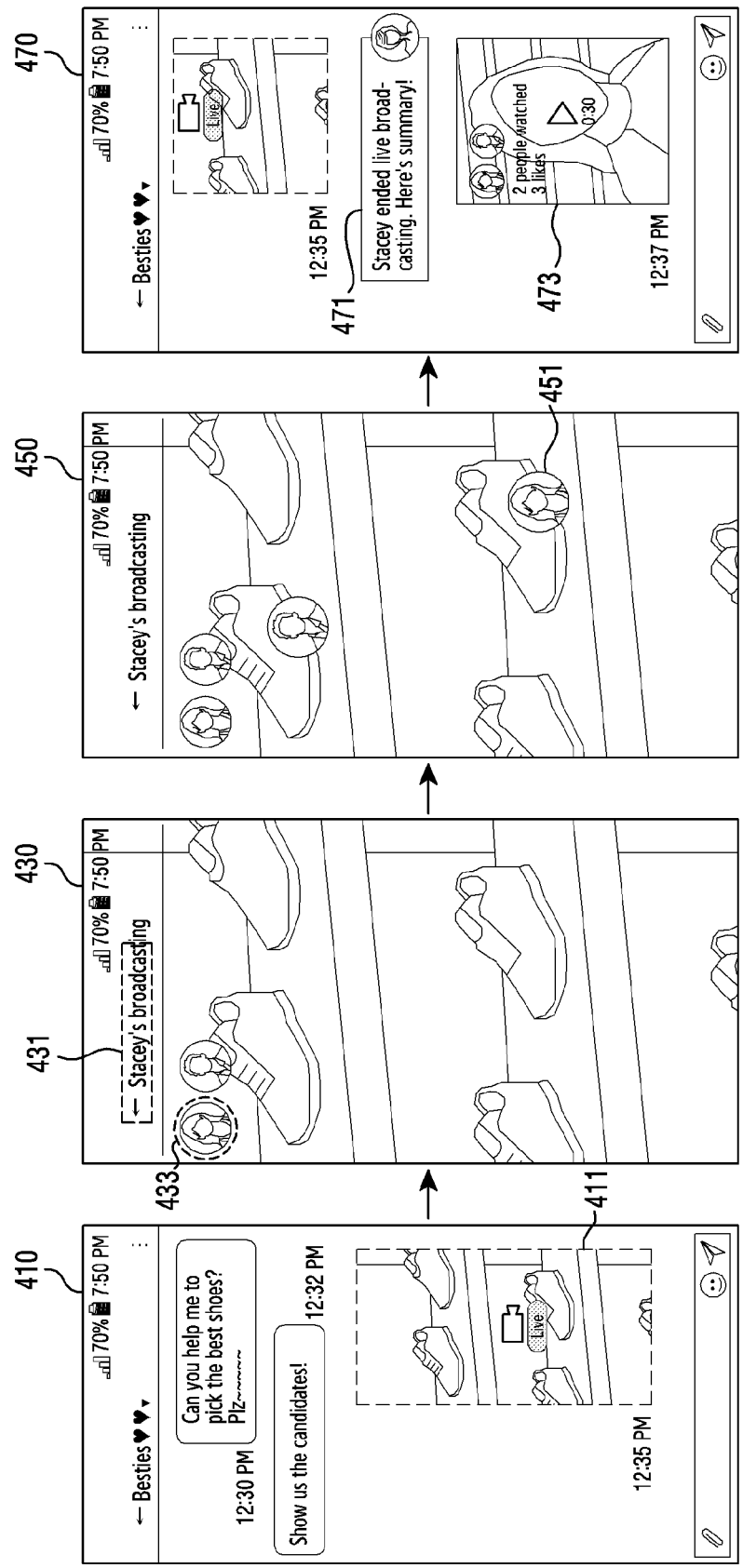
FIG. 4 illustrates an example of a screen displayed by at least one of the first electronic device, the second electronic device, and the third electronic device according to various embodiments.

FIG. 4 illustrates an example of a screen displayed by at least one of the first electronic device 201, the second electronic device 202, and the third electronic device 203 according to various embodiments.

Referring to FIG. 3, in operation 301, the first electronic device 201, the second electronic device 202, and the third electronic device 203 may form the chat group 210. For example, in a messenger application, a chat window for the chat group 210 may include an indication representing the first electronic device 201, an indication representing the second electronic device 202, and an indication representing the third electronic device 203.

The server 204 may store information related to the formed chat group 210. For example, the server 204 may store identification information of the chat group 210, in association with identification information of the electronic devices (e.g., the first electronic device 201, the second electronic device 202, and the third electronic device 203) included in the chat group 210. The server 204 may be a communication medium of electronic devices (the first electronic device 201, the second electronic device 202, and the third electronic device 203) grouped into the chat group 210. The electronic devices (the first electronic device 201, the second electronic device 202, and the third electronic device 203) having formed the chat group 210 may transmit or receive contents (e.g., image data) with each other via the server 204.

In operation 302, the first electronic device 201 (i.e., a broadcaster electronic device) may detect a user input for initiating live casting. For example, the first electronic device 201 may receive the user input (e.g., a touch input for an object in a chat window) for initiating the live casting, via the chat window of the chat group 210.

In operation 303, the first electronic device 201 may transmit a signal for initiation of the live casting to the server 204 in response to detection of the user input for initiating the live casting. The server 204 may receive the signal for initiation of the live casting from the first electronic device 201. The server 204 may assign (or generate) an IP address for the live casting in response to reception of the signal for initiation of the live casting. The server 204 may transmit (not illustrated) a signal (e.g., a signal including an IP address) indicating initiation of the live casting to the second electronic device 202 and the third electronic device 203 which are included in chat group 210.

For example, referring to FIG. 4, the second electronic device 202 and the third electronic device 203 may display a screen 410 in response to initiation of the live casting by the first electronic device 201. For example, the second electronic device 202 and the third electronic device 203 may display an object 411 on the screen 410 (e.g., chat window) in response to reception of the signal indicating initiation of the live casting from the server 204. The object 411 may indicate that the live casting is in progress in the chat group 210.

In operation 304, the server 204 may determine an image type of the live casting. For example, the server 204 may determine the image type of the live casting in response to reception of the signal (hereinafter, a live casting initiation signal) for initiation of the live casting from the first electronic device 201.

In various embodiments, the server 204 may determine the image type of the live casting by analyzing text related to the live casting. In some embodiments, the server 204 may determine the image type of the live casting by analyzing text (e.g., chat record) included in the chat window of the chat group 210. In some other embodiments, the server 204 may determine the image type of the live casting by analyzing a title of the live casting. For example, the title of the live casting may be input via the first electronic device 201 during an initiation (or preparation) procedure of the live casting.

In operation 305, the second electronic device 202 (i.e., a participant electronic device) may detect a user input for participation in the live casting. For example, referring to FIG. 4, the second electronic device 202 may detect a touch input for the object 411 in order to participate in the live casting.

In operation 306, the second electronic device 202 may participate in the live casting in response to detection of the user input (e.g., a touch input for the object 411) for participation in the live casting. For example, the second electronic device 202 may access an IP address for the live casting in response to detection of the touch input for the object 411.

In various embodiments, the second electronic device 202 may display a screen 430 switched (or changed) from the screen 410, in response to detection of the touch input for the object 411. The screen 430 may correspond to a screen of an image captured for the live casting by the first electronic device 201. Detailed descriptions relating to an operation of displaying the screen 430 by the second electronic device will be provided via operation 307 to operation 311.

In operation 307, the first electronic device 201 may acquire (or capture) image data for the live casting. For example, the first electronic device 201 may activate a camera (e.g., the camera module 180) of the first electronic device 201 and may acquire image data via the camera, in response to detection of the user input for initiation of the live casting in operation 302. The first electronic device 201 may display the acquired image data via a display (e.g., the display device 160). In various embodiments, the acquired image data may be displayed within a user interface for the live casting, which is provided by the messenger application.

For example, referring to FIG. 4, the first electronic device 201 may display the screen 430 switched (or changed) from the chat screen, in response to detection of the user input for the live casting. The first electronic device 201 may output, within the screen 430, the image data acquired using the camera.

In operation 308, the first electronic device 201 may transmit, to the server 204, the image data acquired (or captured) via the camera.

In operation 309, the server 204 may store (or temporarily store) the image data received from the first electronic device 201. The server 204 may store the image data received from the first electronic device 201 for each frame. The image data may be stored to generate summary image data for the live casting. The image data may be stored to be transmitted to another electronic device, such as the second electronic device 202.

In operation 310, the server 204 may transmit the image data to the second electronic device 202 that participates in the live casting. The second electronic device 202 may receive the image data from the server 204. The third electronic device 203 that does not participate in the live casting may not receive the image data from the server 204. For example, the second electronic device 202 may receive the image data in response to detection of the user input (e.g., a touch input for the object 411) for participation in the live casting in operation 305.

In operation 311, the second electronic device 202 may display a screen corresponding to the image data received from the server 204. For example, the screen (e.g., the screen 430) displayed in the second electronic device 202 viewing the live casting may correspond to the screen (e.g., the screen 430) displayed in the first electronic device 201 that performs the live casting. Operation 307 to operation 311 may be performed substantially at the same time. However, operations 307 to 311 are not limited thereto.

In some embodiments, the screen 430 may include a title 431 of the live casting or an object 433 related to participants. The title 431 may be input via the first electronic device 201 during the preparation (initiation) procedure of the live casting. The server 204 may store (or temporarily store) text data corresponding to the title 431. The object 433 may indicate information related to a participant (e.g., a user of the second electronic device 202) watching the live casting. For example, the object 433 may include a profile image of the participant. However, the object 433 is not limited thereto, and may include text relating to a name or ID of the participant. The server 204 may store the profile image of the participant to display the object 433.

In operation 312, the second electronic device 202 may detect a user input (hereinafter, a feedback input) for indicating feedback on the live casting, via the displayed screen (e.g., the screen 430) during participation in the live casting. The feedback input may indicate a user's response (or intention) (e.g., a positive response or a negative response) to the currently displayed image data during the live casting. The second electronic device 202 may display an object (e.g., a profile image, an emoticon, a drawing using a stylus pen, text, etc.) corresponding to the feedback input, which is superimposed or floated on the currently displayed screen 430, in response to detection of the feedback input.

For example, the second electronic device 202 may display a screen 450 switched (or changed) from the screen 430 in response to detection of the feedback input. The screen 450 may include an object 451 corresponding to the feedback input. For example, the object 451 may include a profile image of a user (e.g., a user of the second electronic device 202) having input feedback. However, the object 451 is not limited thereto, and the object corresponding to the feedback input may include an emoticon, a drawing using a stylus pen, or text.

In operation 313, the second electronic device 202 may transmit, to the server 204, the feedback data related to the feedback input. For example, the feedback data may include frame information of the image data from which the feedback input is detected, ID information of a subject (e.g., a user of the second electronic device 202) of the feedback input, coordinate information at which the feedback input is detected, or information relating to a type of feedback.

In operation 314, the server 204 may store (or temporarily store) the received feedback data. The server 204 may store the feedback data in association with frame information corresponding to the feedback data (e.g., frame information in which the feedback data is received). The stored feedback data may be used to generate summary image data for the live casting.

In operation 315, the server 204 may transmit feedback data to the first electronic device 201.

In operation 316, the first electronic device 201 may superimpose and display the object corresponding to the received feedback data on the live casting screen (e.g., the screen 430). For example, the first electronic device 201 may display the screen 450 switched (or changed) from the screen 430 in response to reception of the feedback data. The screen (e.g., the screen 450) displayed in the first electronic device 201 may correspond to the screen (e.g., the screen 450) displayed in the second electronic device 202, from which the feedback input is detected. Operation 312 to operation 316 may be performed substantially at the same time. However, operations 312 to 316 are not limited thereto.

If there is another electronic device (e.g., a second electronic device-1) participating in the live casting, the another electronic device may also display a screen corresponding to a screen (e.g., a screen 440 or a screen 450) displayed in the first electronic device 201 (or the second electronic device 202).

In operation 317, the first electronic device 201 may detect a user input for termination of the live casting.

In operation 318, the first electronic device 201 may transmit a live casting termination signal to the server 204 in response to detection of the user input for termination of the live casting. The server 204 may receive the live casting termination signal from the first electronic device 201.

In operation 319, the server 204 may generate summary image data for the live casting in response to reception of the live casting termination signal from the first electronic device 201. For example, the server 204 may generate summary image data on the basis of at least one of the image type of the live casting or the feedback data for the live casting. Detailed descriptions of an operation of generating summary image data will be described later with reference to FIG. 6 to FIG. 19.

In various embodiments, the server 204 may generate different summary image data for a plurality of electronic devices (i.e., the first electronic device 201, the second electronic device 202, or the third electronic device 203) on the basis of user characteristics of the plurality of electronic devices.

In operation 320, the server 204 may transmit, to the first electronic device 201, first summary image data for the first electronic device 201.

In operation 321, the server 204 may transmit, to the second electronic device 202, second summary image data for the second electronic device 202. The second summary image data may be different from the first summary image data.

In operation 322, the server 204 may transmit, to the third electronic device 203, third summary image data for the third electronic device 203. The third summary image data may be different from the first summary image data and the second summary image data.

For example, referring to FIG. 4, the first electronic device 201, the second electronic device 202, or the third electronic device 203 may display a screen 470 (e.g., chat window screen) switched from the screen 450 in response to termination of the live casting. For example, the first electronic device 201, the second electronic device 202, or the third electronic device 203 may display, within the screen 470, an object 471 indicating that the live casting is terminated. If summary image data is received from the server 204, the first electronic device 201, the second electronic device 202, or the third electronic device 203 may display, within the screen 470, an object 473 indicating the summary image data.

The first electronic device 201 may reproduce the first summary image data if an input for the object 473 is detected. The second electronic device 202 may reproduce the second summary image data that is different from the second summary image data, if the input for the object 473 is detected. The third electronic device 203 may reproduce the third summary image data that is different from the first summary image data and the second summary image data, if the input for the object 473 is detected.

Figure 5A:
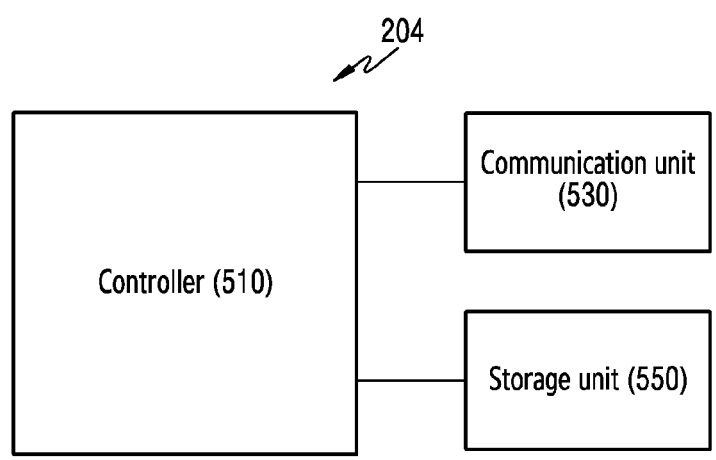
FIG. 5A illustrates an example of a functional configuration of the server according to various embodiments.

FIG. 5A illustrates an example of a functional configuration of the server 204 according to various embodiments.

Referring to FIG. 5A, the server 204 (e.g., the server 108) may include a controller 510, a communication unit 530, and a storage unit 550. However, the server 204 is not limited thereto, and some elements may be omitted, and other components may be added. The functional configuration of server 204 may be implemented by one or more servers.

The communication unit 530 may perform communication with a plurality of electronic devices (e.g., the first electronic device 201, the second electronic device 202, and the third electronic device 203) by using the mobile communication network 290 (e.g., the first network 198 or the second network 199). The communication unit 530 may receive a live casting initiation signal indicating that the live casting is initiated, from the first electronic device 201 (i.e., a broadcaster electronic device). The communication unit 530 may receive, from the first electronic device 201, image data acquired by the first electronic device 201. The communication unit 530 may transmit, to the second electronic device 202 (i.e., a participant electronic device), the image data acquired from the first electronic device 201. The communication unit 530 may receive, from the second electronic device 202, data relating to feedback that is input via the second electronic device 202. The communication unit 530 may transmit the data relating to the feedback, which is received from the second electronic device 202, to the first electronic device 201 or another participant electronic device. The communication unit 530 may receive, from the first electronic device 201, feedback data that is input via the first electronic device 201. The communication unit 530 may receive a live casting termination signal indicating that the live casting is terminated, from the first electronic device 201. The communication unit 530 may transmit a summary image (or partial image) for a live casting image to the first electronic device 201, the second electronic device 202, or the third electronic device 203.

The storage unit 550 may refer to one or more memory sets. The storage unit 550 may execute instructions stored in the storage unit 550 on the basis of signaling with the controller 510. The storage unit 550 may store data and/or commands which are received from other elements (e.g., the controller 510, the communication unit 530, etc.) or generated by other elements.

The storage unit 550 may store (or temporarily store) image data received from the first electronic device 201. The storage unit 550 may store the image data received from the first electronic device 201 for each frame. The storage unit 550 may store feedback data received from the second electronic device 202. The storage unit 550 may store the feedback data received from the second electronic device together with information on a frame to which feedback is input. The image data or feedback data stored in the storage unit 550 may be used to generate summary image for the plurality of electronic devices (e.g., the first electronic device 201, the second electronic device 202, or the third electronic device 203).

The controller 510 may control overall operations of the server 204. The controller 510 may receive commands of other elements (e.g., the communication unit 330, the storage unit 350, etc.), may interpret the received commands, and may perform calculation or may process data according to the interpreted commands. The controller 510 may be implemented in software, may be implemented in hardware, such as a chip, a circuitry, etc., and may be implemented in an aggregation of software and hardware. The controller 510 may be one or may be an aggregation of a plurality of processors.

The controller 510 may determine an image type of the live casting. For example, the controller 510 may determine the image type of the live casting in response to reception of a live casting initiation signal from the first electronic device 201. The controller 510 may determine the image type of the live casting on the basis of one or more texts that are input in a messenger application.

The controller 510 may detect feedback data received from the second electronic device 202 via the communication unit 530, while the image data for the live casting is being received from the first electronic device 201. The controller 510 may control the storage unit 550 to store the feedback data. The controller 510 may control the storage unit 550 to store the feedback data together with the image data.

The controller 510 may generate summary image data for at least one of the plurality of electronic devices (e.g., the first electronic device 201, the second electronic device 202, and the third electronic device 203). The controller 510 may generate a summary image on the basis of at least one of the feedback data and the image type stored (or temporarily stored) in the storage unit 550. For example, the controller 510 may generate the summary image on the basis of frames to which feedback is input. The controller 510 may generate another summary image according to the image type of the live casting. Detailed descriptions of an operation relating to generation of a summary image by the controller 510 will be described later with reference to FIG. 6 to FIG. 22.

Figure 5B:
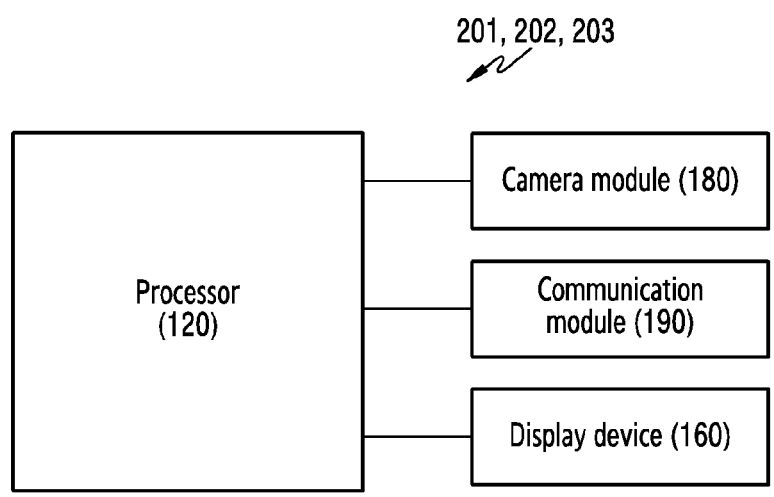
FIG. 5B illustrates an example of functional configurations of the first electronic device, second electronic device, and third electronic device according to various embodiments.

FIG. 5B illustrates an example of functional configurations of the first electronic device, second electronic device, and third electronic device according to various embodiments.

Referring to FIG. 5B, a plurality of electronic devices (e.g., the first electronic device 201, the second electronic device 202, and the third electronic device 203) may include the processor 120, the camera module 180, the communication module 190, and the display device 160. However, the plurality of electronic devices are not limited thereto, and other elements may be omitted, and other components (e.g., the memory 130) may be added.

The processor 120 may control overall operations of the electronic device 201. The processor 120 may receive commands of other elements (e.g., the camera module 180, the communication module 190, and the display device 160), may interpret the received commands, and may perform calculation or may process data according to the interpreted commands. The processor 120 may be implemented in software, may be implemented in hardware, such as a chip, a circuitry, etc., and may be implemented in an aggregation of software and hardware. The processor 120 may be one or may be an aggregation of a plurality of processors.

The camera module 180 may acquire image data for the live casting. For example, the camera module 180 of the first electronic device 201 may acquire image data in response to reception of a control signal for starting the live casting from the processor 120.

The communication module 190 may perform communication in the first electronic device 201, the second electronic device 202, or the third electronic device 203. For example, the communication module 190 of the first electronic device 201 may transmit the image data for the live casting to the server 204. The communication module 190 of the second electronic device 202 may receive the image data for the live casting from the server 204. The communication module 190 of the second electronic device 202 may transmit feedback data for the live casting to the server 204. The communication module 190 of the first electronic device 201 may receive feedback data for displaying in a live casting image from the server 204.

The display device 160 (e.g., a display) may display a screen under a control of the processor 120 in the first electronic device 201, the second electronic device 202, or the third electronic device 203. For example, in the first electronic device 201 or the second electronic device 202, the display device 160 may display the image data for the live casting. In the first electronic device 201 or the second electronic device 202, the display device 160 may include a touch screen, and the touch screen may receive a feedback input on the live casting. In the first electronic device 201 or the second electronic device 202, the display device 160 may display the feedback data for the live casting. For example, the display device 160 of the first electronic device 201 or second electronic device 202 may display feedback data superimposed on live casting image data.

Detailed descriptions of operations of the first electronic device 201, the second electronic device 202, and the third electronic device 203 will be described later with reference to FIG. 6 to FIG. 22.

An electronic device (e.g., the server 204) according to the described various embodiments may include a communication unit (e.g., the communication unit 530) and a controller (e.g., the controller 510), wherein the controller is configured to: while an image received from a first electronic device (e.g., the first electronic device 201) is being transmitted to one or more second electronic devices (e.g., the second electronic device 202) so as to be displayed by the one or more second electronic devices, receive data relating to feedback on the image from the one or more second electronic devices via the communication unit; on the basis of the data relating to the feedback, generate partial images for the one or more second electronic devices from the image; and provide the one or more second electronic devices with the partial images as images corresponding to preferences of users related to the one or more second electronic devices.

In various embodiments, the controller (e.g., the controller 510) may be configured to receive text related to the image from at least one of the first electronic device or the one or more second electronic devices, to determine a type of the image on the basis of the text, and to generate the partial images on the basis of the data on feedback and the type of the image.

In various embodiments, the image may include a plurality of frames, and the controller may be configured to determine one or more frames corresponding to a point in time at which the data relating to feedback is received, from among the plurality of frames, and to generate the partial images including at least a part of the one or more frames. For example, the controller may be configured to determine a sequence of the determined one or more frames on the basis of the determined image type, and to generate the partial images on the basis of the sequence.

In various embodiments, the controller (e.g., the controller 510) may be configured to receive, from the first electronic device, information relating to a location of the first electronic device while receiving the image from the first electronic device, and to generate the partial images on the basis of the location of the first electronic device.

In various embodiments, the controller (e.g., the controller 510) may be configured to receive, from the one or more second electronic devices, information relating to preferences of the one or more respective second electronic devices, and to generate partial images for the one or more respective second electronic devices on the basis of the preferences of the one or more respective second electronic devices.

In various embodiments, the controller may be configured to generate a representative image for the image on the basis of at least one of a case where the number of the data relating to the received feedback is fewer than a designated number or a case where a length of the image is shorter than a designated length, and to transmit the representative image to the one or more second electronic devices.

In various embodiments, the controller may be configured to transmit, in response to reception of the designated number or more of data relating to feedback during a designated time period, data relating to enhancement effects on the image, which is to be displayed in one or more second electronic devices, to the one or more second electronic devices.

In various embodiments, the controller may be configured to transmit at least a part of the image to a third electronic device that does not receive the image, in response to reception of the designated number or more of data relating to feedback during a designated time period.

In various embodiments, data relating to the feedback may be input via the one or more second electronic devices, and the feedback may include positive feedback and negative feedback.

An electronic device (e.g., the first electronic device 201 or the second electronic device 202) according to the described various embodiments may include a display (e.g., the display device 160), a communication module (e.g., the communication 190), and a processor (e.g., the processor 120), wherein the processor is configured to: while an image received from another electronic device (e.g., the server 204) via the communication module is being displayed via the display, detect data relating to feedback that is input by a user of the electronic device; transmit the data relating to the feedback to the another electronic device via the communication module; and on the basis of the data relating to the feedback, receive, from the another electronic device, a partial image relating to the image, which is generated by the another electronic device.

Figure 6:
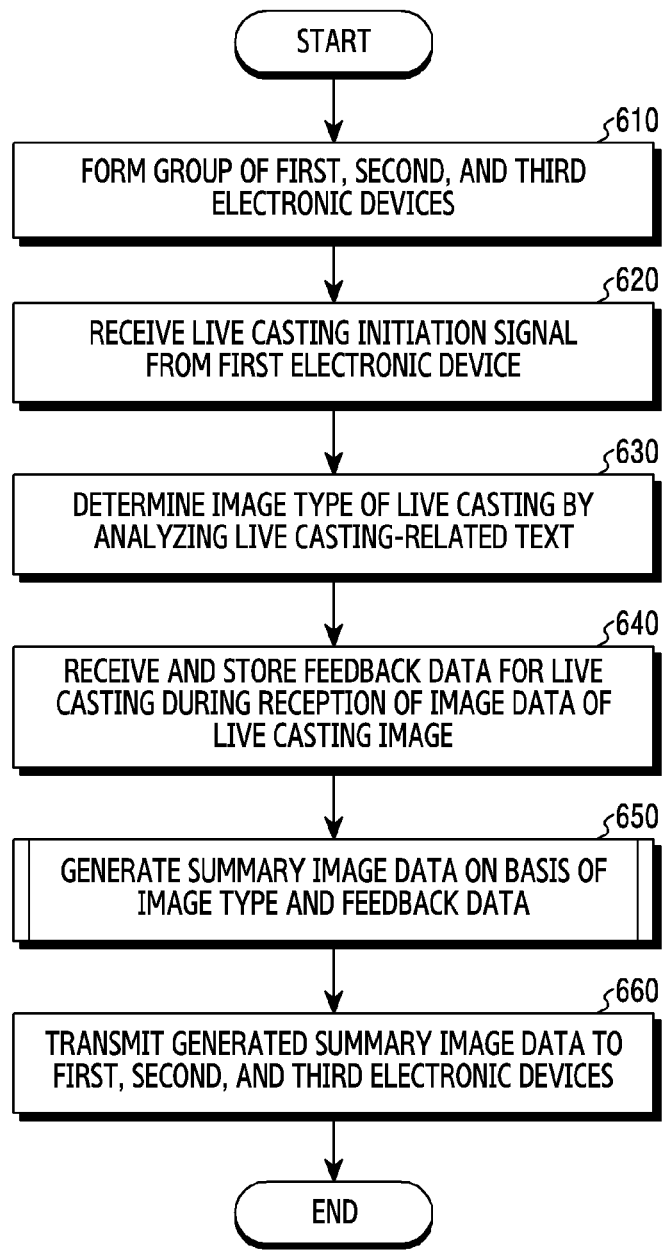
FIG. 6 illustrates an example of an operation of the server according to various embodiments.

FIG. 6 illustrates an example of an operation of the server 204 according to various embodiments.

Figure 7:
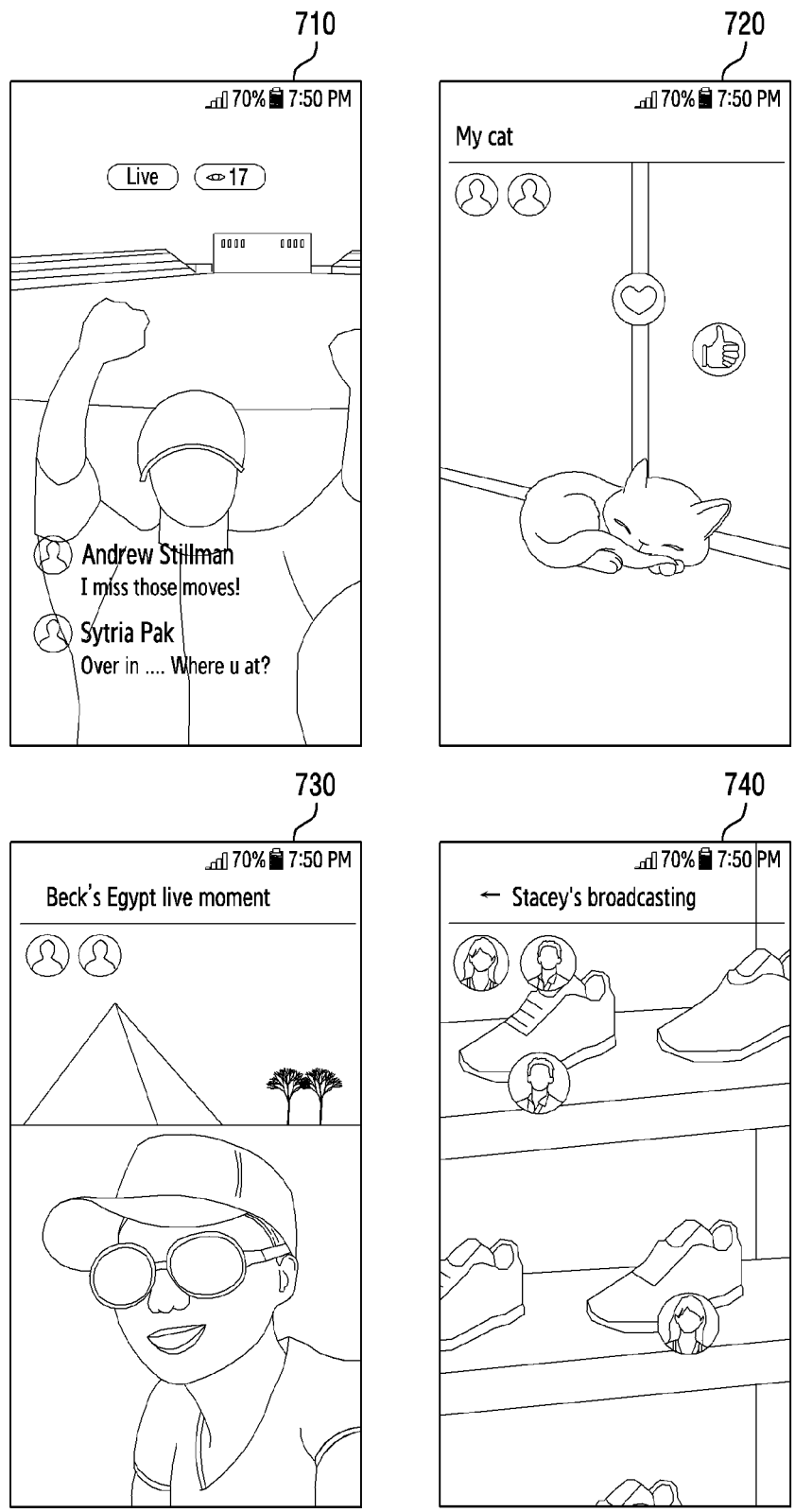
FIG. 7 illustrates an example of an image type of live casting according to various embodiments.

FIG. 7 illustrates an example of an image type of live casting according to various embodiments.

Figure 8:
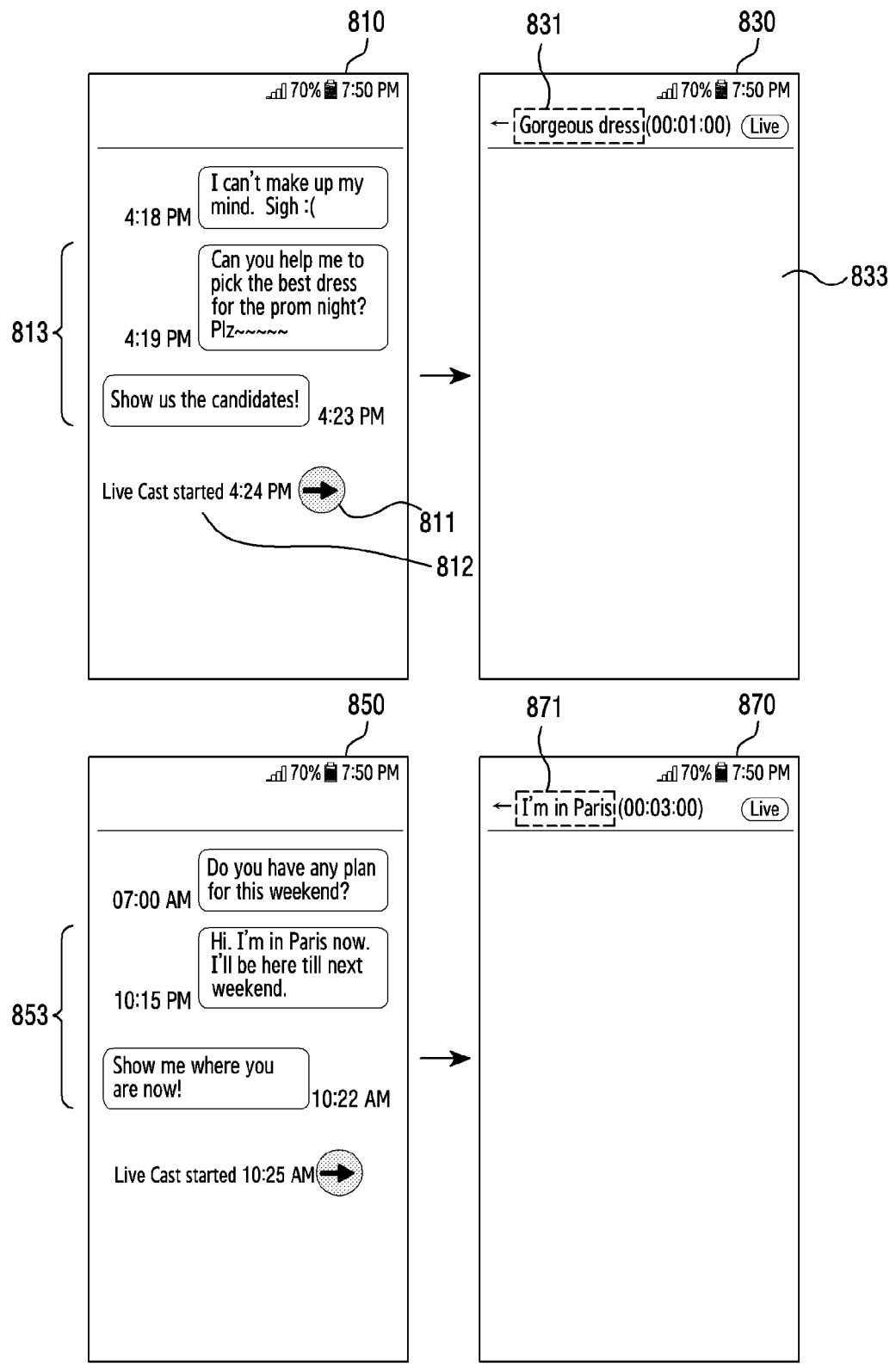
FIG. 8 illustrates an example of text related to live casting, which is used to determine an image type of the live casting according to various embodiments.

FIG. 8 illustrates an example of text related to live casting, which is used to determine an image type of the live casting according to various embodiments.

Figure 9:
FIG. 9 illustrates an example of a database that stores feedback data according to various embodiments.

FIG. 9 illustrates an example of a database 900 that stores feedback data according to various embodiments.

Referring to FIG. 6, in operation 610, the controller 510 may form a chat group (e.g., the chat group 210) including at least one of a plurality of electronic devices (e.g., the first electronic device 201, the second electronic device 202, or the third electronic device 203). For example, an indication indicating the first electronic device 201, an indication indicating the second electronic device 202, and an indication indicating the third electronic device 203 may be included in one chat window in the messenger application. The controller 510 may store information related to the chat group 210 corresponding to the chat window in the storage unit 550. For example, the controller 510 may store, in a database, identification information of the chat group 210, identification information of the electronic devices (e.g., the first electronic device 201, the second electronic device 202, and the third electronic device 203) included in the chat group 210, or profile image information of the electronic devices (e.g., the first electronic device 201, the second electronic device 202, and the third electronic device 203) included in the chat group 210.

In operation 620, the controller 510 may receive a live casting initiation signal from the first electronic device 201 by using the communication unit 530. The controller 510 may detect the live casting initiation signal received via the communication unit 530.

In operation 630, the controller 510 may determine an image type of live casting by analyzing text related to the live casting. For example, the controller 510 may determine the image type of the live casting in response to reception of a live casting initiation signal from the first electronic device 201. However, determination of the image type of the live casting is not limited thereto, and the controller 510 may determine the image type of the live casting at any point in time.

For example, referring to FIG. 7, image types of live casting according to various embodiments may include a sports game image 710, a pet image 720, a travel image 730, or a shopping image 740. However, the image types of the live casting are not limited thereto.

For example, the image types of the live casting may include a first type (e.g., the sports game image 710) in which an order of scenes in the image is important, a second type (e.g., the pet image 720) in which an order of scenes in the image is not important and a degree of feedback is important, a third type (e.g., the travel image 730) in which the image is divided into sections according to a measurement value of a GPS receiver of the first electronic device 201, or, a fourth type (e.g., the shopping image 740) in which the image is divided into sections according to a measurement value of a gyro sensor (or acceleration sensor) of the first electronic device 201.

For example, referring to FIG. 8, the controller 510 may determine an image type of live casting by using text related to the live casting (e.g., a chat record included in the chat window or a title of live casting).

In some embodiments, after the first electronic device 201 initiates the live casting, the second electronic device 202 may display a screen 810 via a display (e.g., the display device 160) before participating in the live casting. The second electronic device 202 may display a screen 830 via the display after participating in the live casting.

For example, the screen 810 (e.g., chat window) may include chat records 813 of electronic devices (e.g., the first electronic device 201, the second electronic device 202, and the third electronic device 203) included in the chat group 210. The screen 810 may include text 812 indicating that the live casting is initiated at 4:24 PM within the chat group 210. The screen 810 may include an object 811 (e.g., the object 411 of FIG. 4) corresponding to a link for the second electronic device 202 to participate in (or enter) the live casting. The second electronic device 202 may display the live casting screen 830, which is changed from the screen 810, in response to detection of a user input for the object

811. The screen 830 may display a title 831 of the live casting and image data 833 (not illustrated) acquired by the first electronic device. The screen 830 may indicate that 1 minute has passed since the initiation of the live casting.

The controller 510 may store text data relating to the chat record 813 and text data relating to the title 831 of the live casting in a database related to the chat group 210. When the live casting is initiated, the controller 510 may determine an image type of the live casting by analyzing text data relating to a chat record from a time at which the live casting is initiated to a designated time. For example, referring to the screen 810, if the live casting is initiated at 4:24 PM, the controller 510 may analyze the chat record 813 until 4:19 PM, which is a designated time (e.g., 5 minutes) before the point in time at which the live casting is initiated. As a result of analyzing the chat record 813, the controller 510 may determine that the image type of the live casting is a shopping image, on the basis of keywords "pick" and "best dress".

When the live casting is initiated, the controller 510 may determine the image type of the live casting by analyzing text data relating to the title 831 of the live casting, which is stored in the database. For example, referring to the screen 830, as a result of analyzing the title 831, the controller 510 may determine that the image type of the live casting is a shopping image, on the basis of the keyword "dress".

In some other embodiments, after the first electronic device 201 initiates the live casting, the second electronic device 202 may display a screen 850 before participating in the live casting. The second electronic device 202 may display a casting screen 870, which is changed from the screen 850, after participating in the live casting.

For example, referring to the screen 850, if the live casting is initiated at 10:25 AM, the controller 510 may analyze a chat record 853 until 10:15 AM, which is a designated time (e.g., 10 minutes) before a point in time at which the live casting is initiated. As a result of analyzing the chat record 853, the controller 510 may determine that the image type of the live casting is a travel image, on the basis of a keyword "in Paris". Referring to the screen 870, as a result of analyzing a title 871, the controller 510 may determine that the image type of the live casting is a travel image, on the basis of the keyword "in Paris".

In various embodiments, the controller 510 may determine an image type on the basis of at least one of a chat record and a title of the live casting. For example, the controller 510 may determine the image type by analyzing a designated number of chat records stored before the live casting is initiated. As another example, the controller 510 may determine the image type by analyzing a designated data-size of chat records stored before the live casting is initiated. As a result of analyzing a first chat record of a designated amount (e.g., a designated time, a designated number, and a designated data size), if the image type is unable to be determined, the controller 510 may further analyze a designated amount of a second chat record that is stored before the first chat record.

In operation 640, the controller 510 may receive feedback data on the live casting while receiving image data from the first electronic device 201. The controller 510 may receive feedback data from the second electronic device 202 viewing the live casting. However, the controller 510 is not limited thereto, and may receive feedback from the first electronic device 201 that performs the live casting. The controller 510 may store (or temporarily store) the received feedback data in the storage unit 550.

For example, referring to FIG. 9, the controller 510 may store the received feedback data in the manner as shown in the database 900. The feedback data may include information 910 on a frame from which feedback is detected, ID information 920 of a subject of a feedback input, information 930 on coordinates at which the feedback input is detected, or information 940 relating to a feedback type. Referring to ID information 920, electronic device A of user A and electronic device B of user B may correspond to a second electronic device-1 and a second electronic device-2, which are participant electronic devices. Alternatively, one of electronic device A of user A and electronic device B of user B may correspond to the first electronic device 201.

For example, row 901 may indicate feedback data that is input via frame 151 which is a 151st frame of a live casting image. Row 901 may indicate that user A inputs first type feedback to coordinates (X1, Y1) of the display via frame 151 of the live casting image. Row 901 may indicate that user B inputs the first type feedback to coordinates (X2, Y2) of the display via frame 151 of the live casting image.

Row 902 may indicate feedback data that is input via frame 200 which is a 200th frame of the live casting image. Row 902 may indicate that user A inputs second type feedback to coordinates (X3, Y3) of the display via frame 200 of the live casting image. Row 902 may indicate that user B inputs the first type feedback to coordinates (X4, Y4) of the display via frame 200.

Row 903 may indicate that user A inputs third type feedback to coordinates (X5, Y5) of the display via an m-th frame of the live casting image.

Row 904 may indicate that user B inputs fourth type feedback via an n-th frame of the live casting image.

For example, the first type feedback may be to display a user profile image superimposed on a live casting screen. That is, if a user of the second electronic device 202 inputs the first type feedback, the second electronic device 202 may superimpose and display a profile image of the user of the second electronic device 202 on the live casting screen. The server 204 having received the feedback data from the second electronic device 202 may transmit the feedback data to the first electronic device 201 (or the second electronic device-1 that is another participant), so that the first electronic device 201 (or the second electronic device-1 that is another participant) superimposes and displays the profile image of the user of the second electronic device 202 on the live casting screen.

The second type feedback may be to display a designated image (e.g., a thumb up emoticon, a thumb down emoticon, a smiley face emoticon, or an angry face emoticon) superimposed on the live casting screen. The third type feedback may be to display a drawing superimposed on the live casting screen by using a stylus pen. The fourth type feedback may be to receive a participant's speech via a microphone, convert the received speech into text, and display the converted text superimposed on the live casting screen.

In operation 650, the controller 510 may generate summary image data on the basis of the image type and feedback data of the live casting. For example, first summary image data for the first electronic device 201, second summary image data for the second electronic device 202, and third summary image data for the third electronic device 201 may be different from each other. Detailed descriptions of an operation of generating summary image data will be described later with reference to FIG. 10 to FIG. 19.

In operation 660, the controller 510 may transmit the generated summary image data to the first electronic device 201, the second electronic device 202, and the third electronic device 203, which are included in the chat group 210, via the communication unit 530. For example, the controller 510 may transmit the first summary image data to the first electronic device 201, may transmit the second summary image data to the second electronic device 202, and may transmit the third summary image data to the third electronic device 203.

Figure 10:
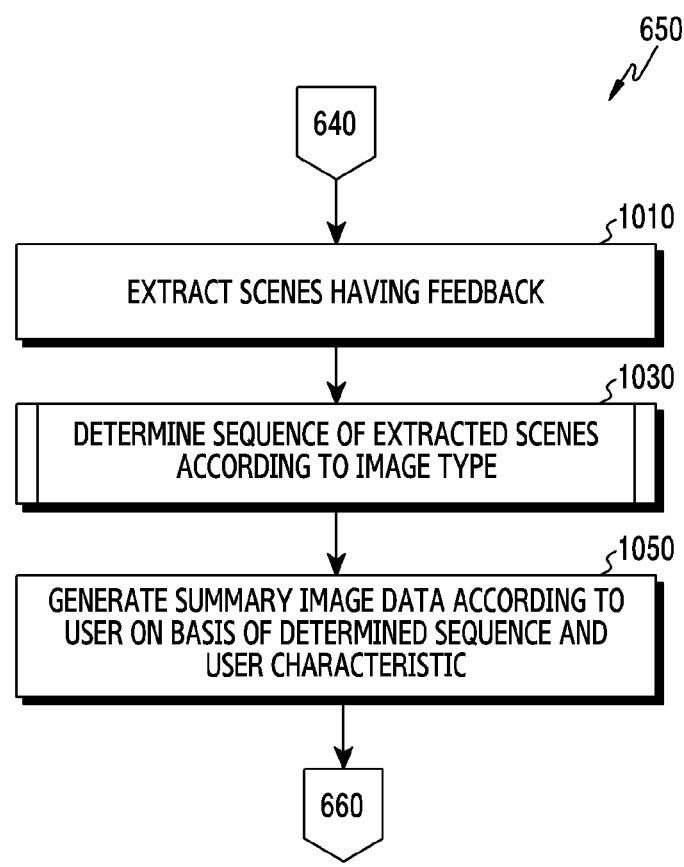
FIG. 10 illustrates an example of an operation of generating summary image data by the server according to various embodiments.

FIG. 10 illustrates an example of an operation of generating summary image data by the server 204 according to various embodiments. Operations of FIG. 10 may correspond to operation 650 of FIG. 6.

Figure 11:
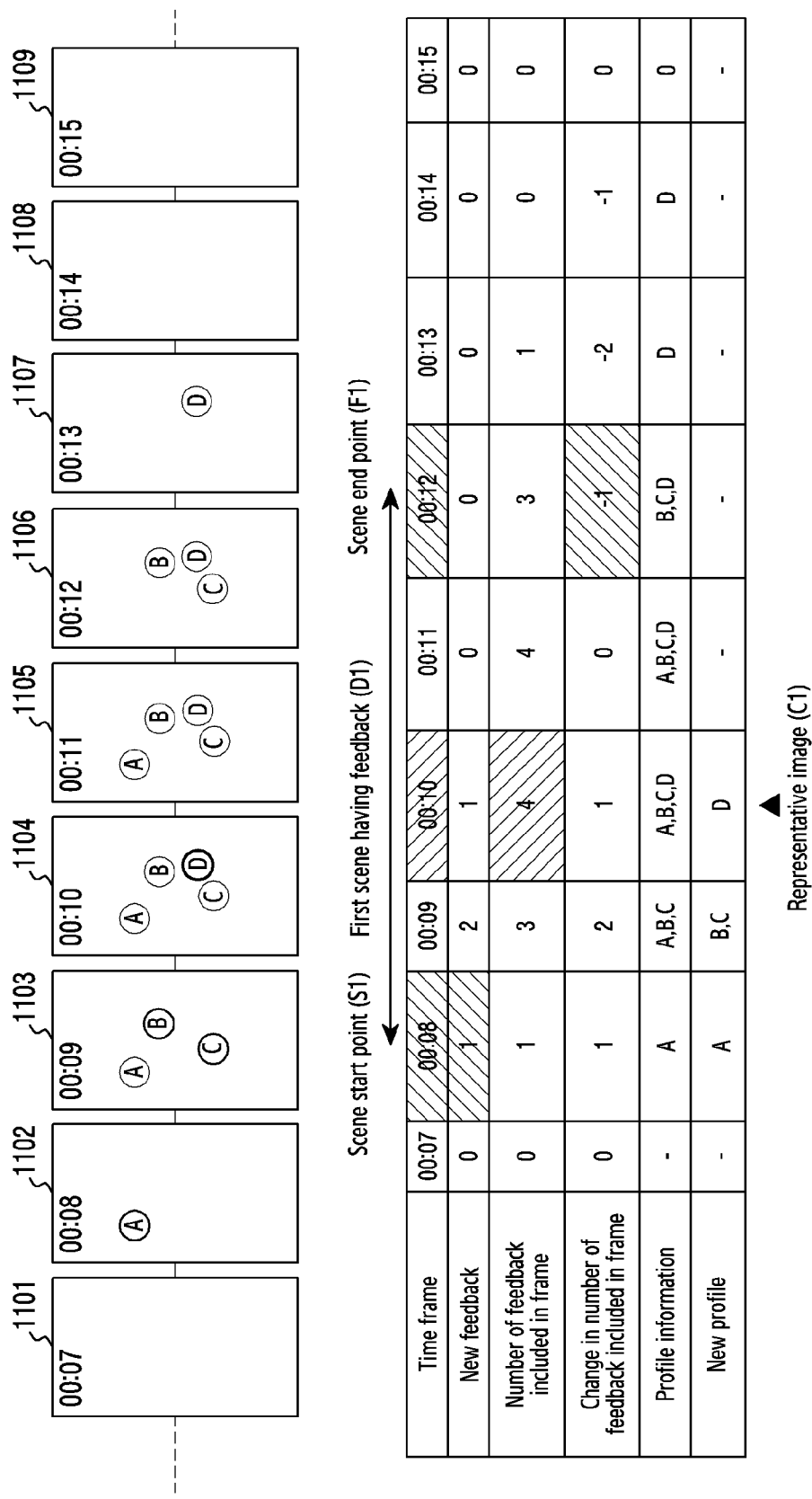
FIG. 11 illustrates an example of a method for extracting scenes having feedback by the server according to various embodiments.

FIG. 11 illustrates an example of a method for extracting scenes having feedback by the server 204 according to various embodiments.

Figure 12:
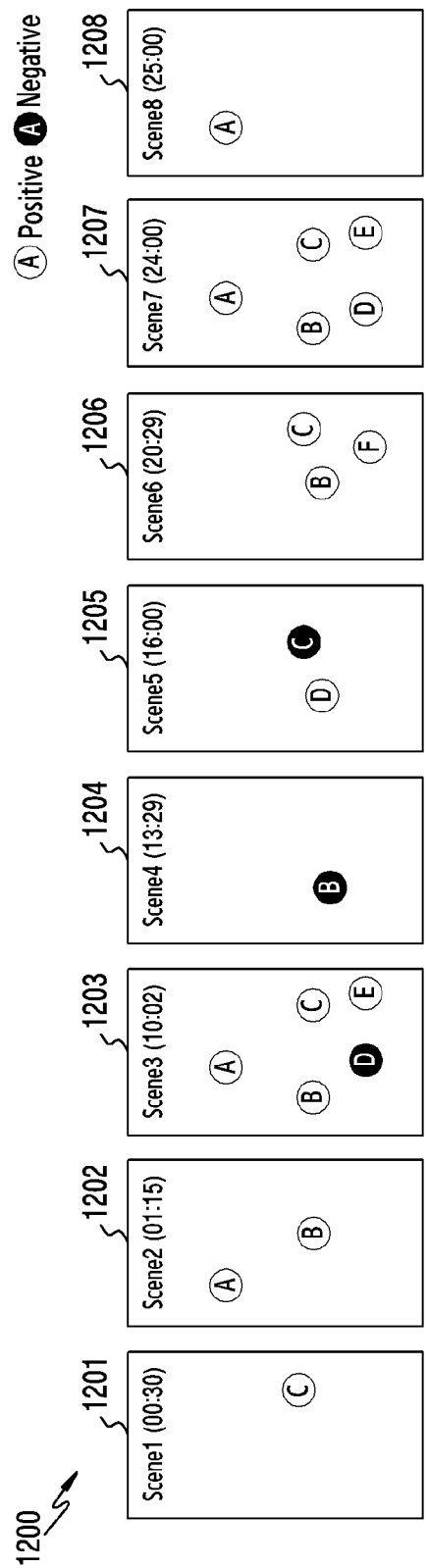
FIG. 12 illustrates an example of a sequence of extracted scenes in first type live casting according to various embodiments.

FIG. 12 illustrates an example of a sequence of extracted scenes in first type live casting according to various embodiments.

Figure 13:
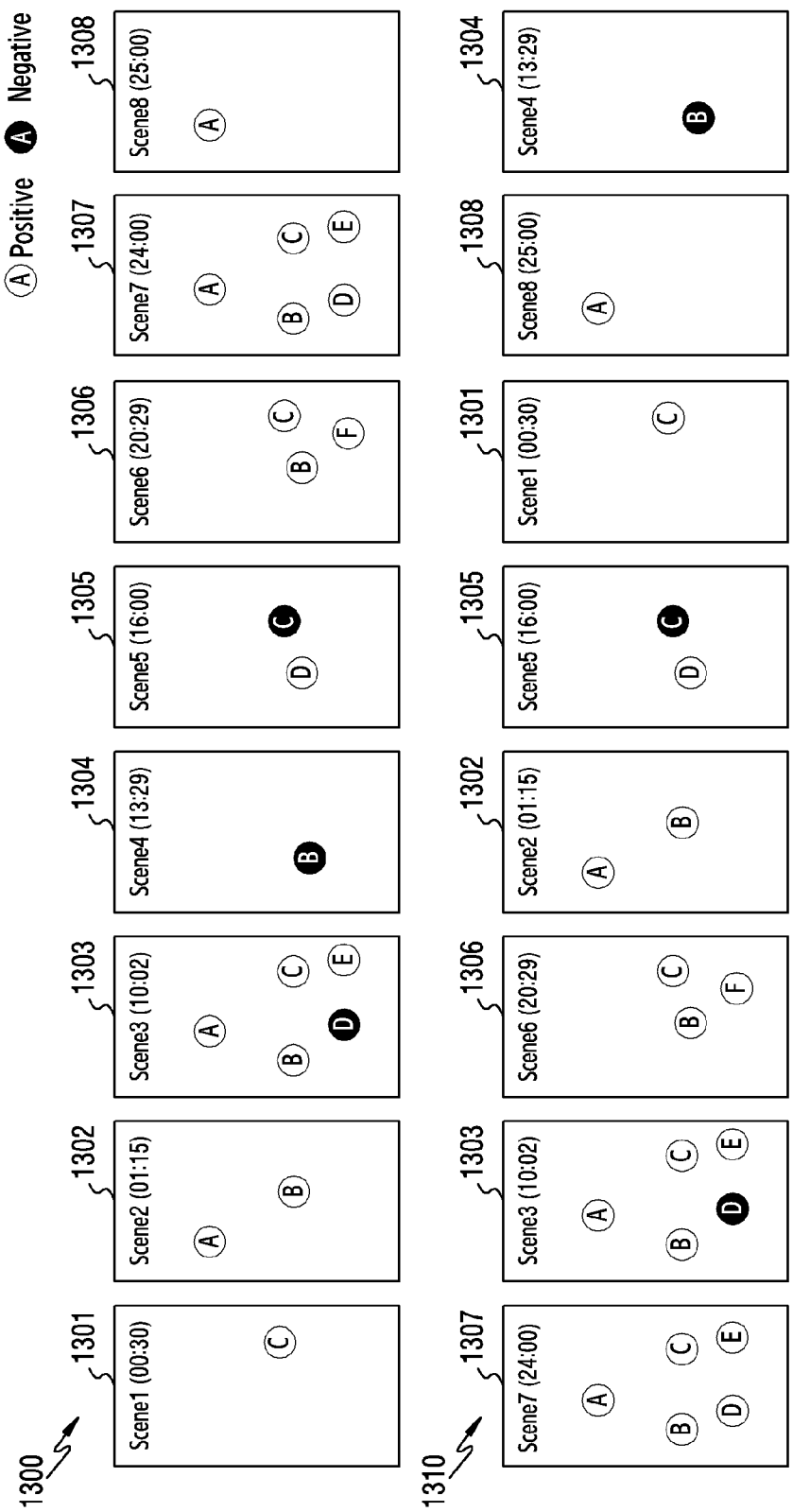
FIG. 13 illustrates an example of a sequence of extracted scenes in second type live casting according to various embodiments.

FIG. 13 illustrates an example of a sequence of extracted scenes in second type live casting according to various embodiments.

Figure 14:
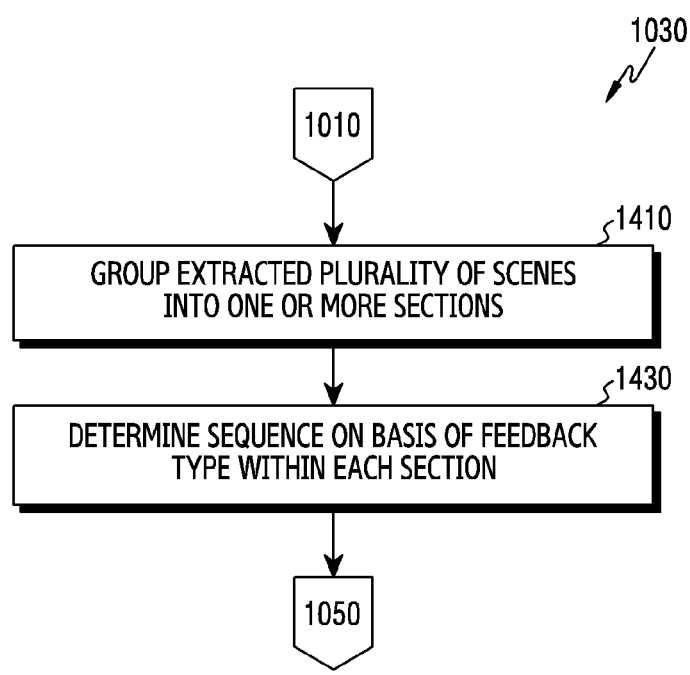
FIG. 14 illustrates an example of an operation of determining a sequence of extracted scenes by the server with respect to third type live casting or fourth type live casting according to various embodiments.

FIG. 14 illustrates an example of an operation of determining a sequence of extracted scenes by the server 204 with respect to third type live casting or fourth type live casting according to various embodiments.

Figure 15:
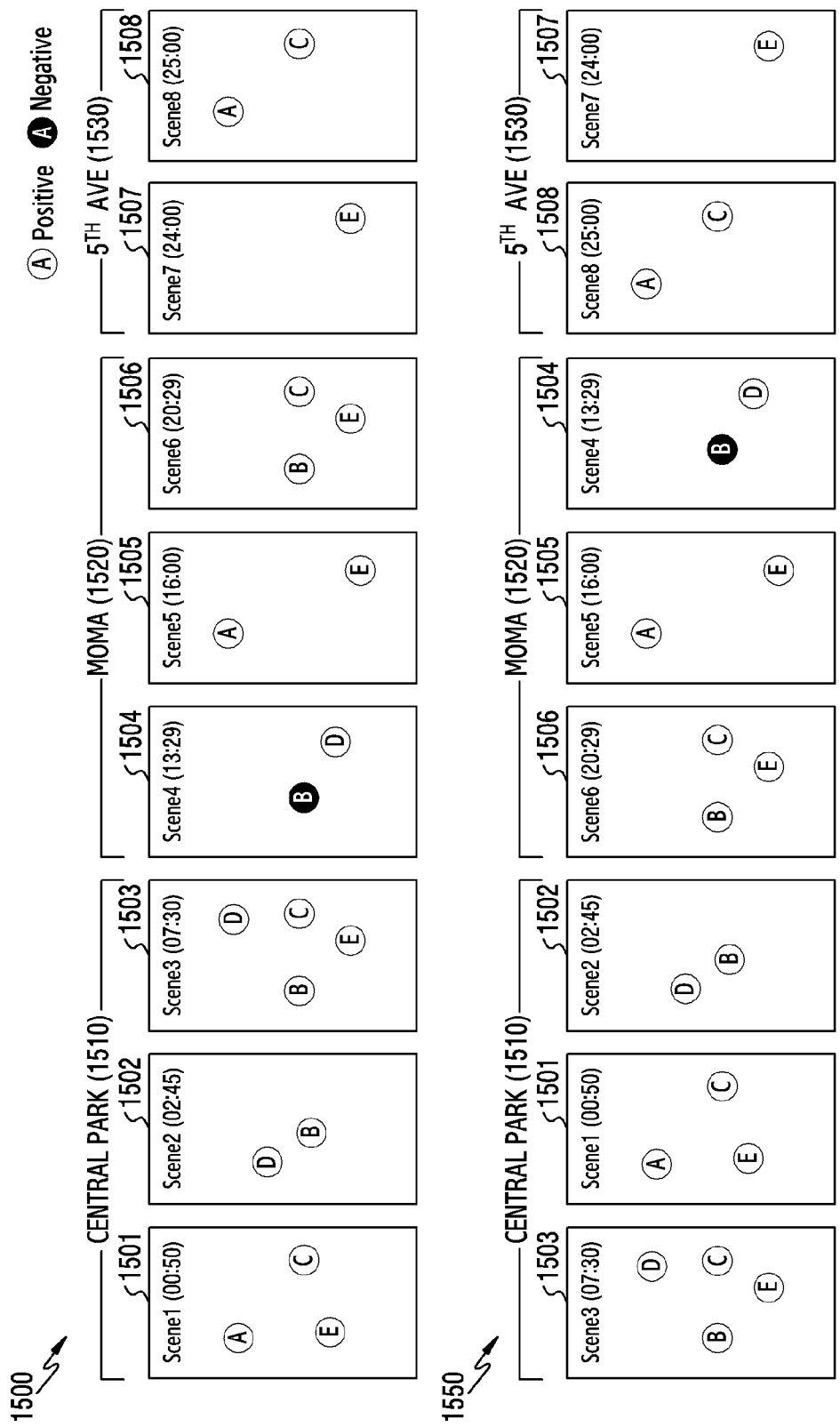
FIG. 15 illustrates an example of grouping extracted scenes in the third type live casting according to various embodiments.

FIG. 15 illustrates an example of grouping extracted scenes in the third type live casting according to various embodiments.

Figure 16:
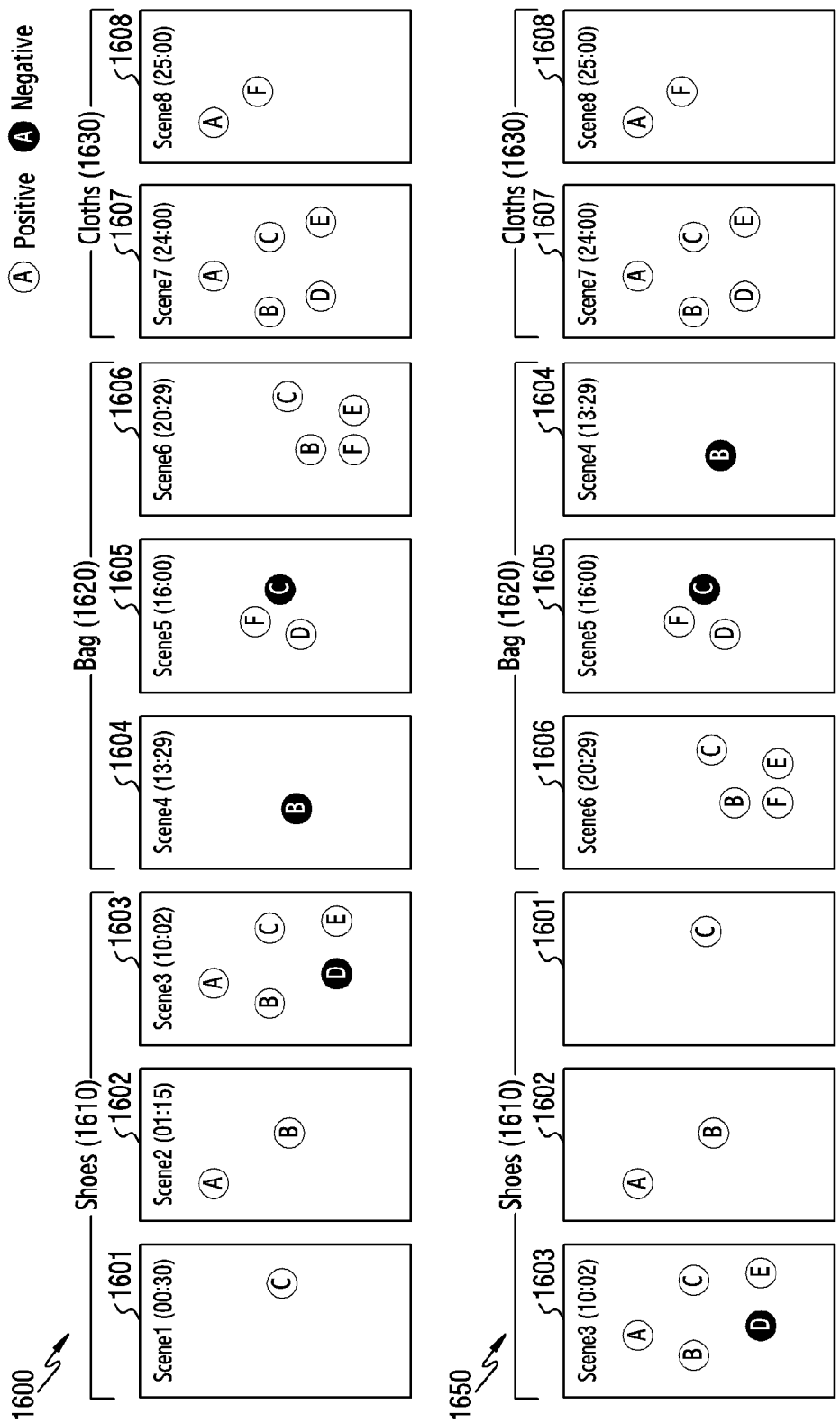
FIG. 16 illustrates an example of grouping extracted scenes in the fourth type live casting according to various embodiments.

FIG. 16 illustrates an example of grouping extracted scenes in the fourth type live casting according to various embodiments.

Referring to FIG. 10, operation 1010 may be performed after the controller 510 receives and stores the feedback data for the live casting in operation 640 of FIG. 6.

In operation 1010, the controller 510 may extract scenes having feedback from a live-casted image. The scenes having feedback may be used to generate a summary image (or partial image) of the full live casting image. The controller 510 may extract the scenes having feedback from the live-casted image by using feedback data stored (or temporarily stored) in the storage unit 550. The controller 510 may extract the scenes having feedback from the image data stored (or temporarily stored) in the storage unit 550 by means of the database 900.

For example, after the live casting is terminated, the controller 510 may extract the scenes having feedback by using the feedback data and image data stored in the storage unit 550. As another example, during the live casting, the controller 510 may receive the feedback data and may extract the scenes having feedback, in parallel with the live casting.

For example, referring to FIG. 11, a method for extracting a first scene D1 having feedback by the controller 510 may be described. Frame 1101 to frame 1109 may indicate the image data displayed via the display of the first electronic device 201 or second electronic device 202 during the live casting. A, B, C, and D may indicate a plurality of second electronic devices 202 viewing the live casting. Alternatively, one of A, B, C, and D may indicate the first electronic device 201 that acquires an image for the live casting. In FIG. 11, a time interval between frames (e.g., a time interval between frame 1101 and frame 1101) is illustrated to be 1 second, but this is merely an example for a simple description, and is not limited thereto.

Frame 1101 may indicate that the controller 510 does not receive feedback data from the plurality of electronic devices (e.g., A, B, C, and D) via the frame 1101 (i.e., during relay of frame 1101). The number of new feedback of frame 1101 may be 0, and a total number of feedback included in frame 1101 may also be 0.

Frame 1102 may indicate that the controller 510 receives feedback data from A via frame 1102 (i.e., during relay of frame 1102). The number of new feedback of frame 1102 may be 1 (i.e., feedback of A), and a total number of feedback included in frame 1102 may also be 1 (i.e., feedback of A). The total number of feedback included in frame 1102 is increased by 1 from frame 1101, and therefore the amount of change in the number of feedback on frame 1102 may be +1. The feedback of A, which is received via frame 1102, may be displayed in the plurality of electronic devices (e.g., A, B, C, and D) for a designated frame (or designated time) from frame 1102. For example, while four frames from frame 1102 (i.e., frame 1102, frame 1103, frame 1104, and frame 1105) are being relayed, the feedback of A, which is received via frame 1102, may be superimposed and displayed on the live casting image and may disappear from frame 1105.

Frame 1103 may indicate that the controller 510 receives feedback data from B and C via frame 1103 (i.e., during relay of frame 1103). The number of new feedback of frame 1103 may be 2 (i.e., feedback of B and C), and a total number of feedback included in frame 1103 may be 3 (i.e., feedback of A, B, and C). The total number of feedback included in frame 1103 is increased by 2 from frame 1102, and therefore the amount of change in the number of feedback on frame 1103 may be +2.

Frame 1104 may indicate that the controller 510 receives feedback data from D via frame 1104. The number of new feedback of frame 1104 may be 1 (i.e., feedback of D), and a total number of feedback included in frame 1104 may be 4 (i.e., feedback of A, B, C, and D). The total number of feedback included in frame 1104 is increased by 1 from frame 1103, and therefore the amount of change in the number of feedback on frame 1104 may be +1.

Frame 1105 may indicate that the controller 510 does not receive feedback data from the plurality of electronic devices (e.g., A, B, C, and D) via the frame 1105. The number of new feedback of frame 1105 may be 0. A total number of feedback included in frame 1105 may be 4 (i.e., feedback of A, B, C, and D). The total number of feedback included in frame 1105 is the same as the total number of feedback included in frame 1104, and therefore the amount of change in the number of feedback on frame 1105 may be 0.

Frame 1106 may indicate that the controller 510 does not receive feedback data from the plurality of electronic devices (e.g., A, B, C, and D) via the frame 1106. The number of new feedback of frame 1106 may be 0. In frame 1106, the feedback of A, which has been displayed from frame 1102, may disappear. A total number of feedback included in frame 1106 may be 3 (i.e., feedback of B, C, and D). The total number of feedback included in frame 1106 is decreased by 1 from frame 1105, and therefore the amount of change in the number of feedback on frame 1106 may be −1.

In various embodiments, the controller 510 may determine a frame, in which feedback starts to increase, as a start frame of a scene. For example, the controller 510 may determine, as a start frame of a scene, a frame (e.g., frame 1102) in which new feedback changes from 0 (or a negative number) to a positive number, a frame (e.g., frame 1102) in which a total number of feedback included in the frame changes from 0 to a positive number, or a frame (e.g., frame 1102) in which an amount of change in a total number of feedback included in the frame changes from 0 (or a negative number) to a positive number.

In various embodiments, the controller 510 may determine a frame, in which feedback starts to decrease, as an end frame of a scene. For example, the controller 510 may determine, as an end frame of a scene, a frame in which an amount of change in a total number of feedback included in the frame changes from 0 (or a positive number) to a negative number.

In various embodiments, the controller 510 may determine (or extract) an image from a determined start frame to a determined end frame, as a scene having feedback. Therefore, in the specification, a scene may be a moving image, not a still image. For example, referring to FIG. 11, the controller 510 may determine an image from frame 1102 to frame 1106, as a scene having feedback. If the controller 510 receives feedback (e.g., feedback of A) for the first time via frame 1102 8 seconds after the live casting is initiated, the image from frame 1102 to frame 1106 may be the first scene D1 that is a first scene having feedback. The first scene D1 may be an image having a duration of 4 seconds.

The live casting image may include one or more scenes. Although not illustrated, even after frame 1109 of 15 seconds, during the live casting, the controller 510 may receive feedback from the plurality of electronic devices (e.g., A, B, C, and D), and may further determine (or extract) scenes having the received feedback. Within the live casting image, the scenes having feedback may be referred to as the first scene D1, a second scene D2, and a third scene D3 in chronological order.

The scenes having feedback may be used to generate summary image data (or partial image data) of the full live casting image. The controller 510 may generate a summary image (or partial image) of the live casting image, which includes at least one of one or more scenes.

In some embodiments, the controller 510 may determine at least one representative image. For example, the controller 510 may determine one or more representative images for one or more respective scenes, and may determine one representative image for the full live casting image.

A representative image may be a still image. For example, the controller 510 may determine, as a representative image, a frame (e.g., frame 1104 or frame 1105 in D1) including a highest number of feedback. For example, in D1, the controller 510 may determine, as a representative image C1, frame 1104 that is first reproduced from among frame 1104 and frame 1105 which include the highest number (i.e., 4) of feedback.

In some embodiments, the controller 510 may determine at least one representative image, instead of generating a summary image for the live casting. For example, if a reproduction time of the live casting is shorter than a designated time (e.g., 5 sections), the controller 510 may determine a representative image without generating a summary image. As another example, during relay of the live casting, if the number of feedback received from one or more second electronic devices 202 is less than a designated number, the controller 510 may determine a representative image without generating a summary image. As still another example, if a difference between a reproduction time of the live casting and a reproduction time of a summary image is smaller than a designated value, the controller 510 may determine a representative image.

The controller 510 may transmit at least one representative image to the first electronic device 201, the second electronic device 202, or the third electronic device 203 via the communication unit 510.

In operation 1030, the controller 510 may determine a sequence (or order) of the extracted scenes according to an image type of the live casting.

For example, referring to FIG. 7, the image type of the live casting may include a first type (e.g., the sports game image 710) in which an order of scenes in the image is important, a second type (e.g., the pet image 720) in which an order of scenes in the image is not important and a degree of feedback is important, a third type (e.g., the travel image 730) in which the image is divided into sections according to a measurement value of a GPS receiver of the first electronic device 201, or, a fourth type (e.g., the shopping image 740) in which the image is divided into sections according to a measurement value of a gyro sensor (or acceleration sensor) of the first electronic device 201.

Hereinafter, examples of a method for determining a sequence of scenes having feedback according to the image type of the live casting may be described with reference to FIG. 12 to FIG. 16.

In the following drawings, A, B, C, D, and E may indicate the plurality of second electronic devices 202 viewing the live casting. Alternatively, one of A, B, C, D, and E may indicate the first electronic device 201 that acquires an image for the live casting. That is, during acquisition of an image for the live casting, the first electronic device 201 may also detect a feedback input from a user (i.e., a broadcaster) and transmit, to the server 204, data relating to the detected feedback input.

For example, referring to FIG. 12, if the controller 510 determines the image type of the live casting to be the first type, a method for determining a sequence of scenes having feedback may be described.

The controller 510 may determine (or extract) scenes having feedback from image data for the live casting of the first type (e.g., the sports game image 710). Scene 1 1201, scene 2 1202, scene 3 1203, scene 4 1204, scene 5 1205, scene 6 1206, scene 7 1208, and scene 8 1208 may be scenes having feedback, which are extracted from a live casting image of the first type.

Each of scene 1 1201 to scene 8 1208 may be moving image including a plurality of frames. Duration of each of scene 1 1201 to scene 8 1208 may be different.

For example, scene 1 1201 may be a moving image including a frame 30 seconds after initiation of the live casting. Scene 1 1201 may correspond to a plurality of frames in which positive feedback of C (i.e., positive feedback that is input via C) is displayed. For example, the controller 510 may receive positive feedback from C 30 seconds after the initiation of the live casting, and may relay the positive feedback of C for a designated time (e.g., 4 seconds when referring to FIG. 11). For example, the controller 510 may determine (or extract) the moving image (i.e., the plurality of frames), in which the positive feedback of C is relayed, as scene 1 1201.

Scene 2 1202 may be a moving image including a frame 1 minutes 15 seconds after the initiation of the live casting. Scene 2 1202 may be a moving image including positive feedback of A and positive feedback of B.

Scene 3 1203 may be a moving image including a frame 10 minutes 2 seconds after the initiation of the live casting. Scene 3 1203 may be a moving image including positive feedback of A, B, C, and E and negative feedback of D.

In various embodiments, positive feedback may be feedback for superimposing a smiley face emoticon, a thumb up emoticon, etc. on the live casting image. Negative feedback may be feedback for superimposing an angry face emoticon, a thumb down emoticon, etc. on the live casting image. For example, feedback for superimposing and displaying a profile image on the live casting image may be positive feedback. For example, the controller 510 may determine whether feedback is positive feedback or negative feedback, by analyzing text of the feedback that is input in a text format.

Referring to FIG. 12, for a summary image of the live casting of the first type (e.g., the sports game image 710), it may be required to reproduce the plurality of scenes in chronological order. Accordingly, the controller 510 may determine a sequence 1200, in which scene 1 1201 to scene 1208 are arranged in chronological order, as a sequence of scenes for the live casting of the first type.

Referring to FIG. 13, if the controller 510 determines the image type of the live casting to be the second type, a method for determining a sequence of scenes having (or including) feedback may be described.

The controller 510 may determine (or extract) scenes having feedback from image data for the live casting of the second type (e.g., the pet image 720). Scene 1 1301, scene 2 1302, scene 3 1303, scene 4 1304, scene 5 1305, scene 6 1306, scene 7 1308, and scene 8 1208 may be scenes having feedback, which are extracted from a live casting image of the second type.

Sequence 1300 may indicate an arrangement of scene 1 1301 to scene 8 1308 in chronological order. For a summary image of the live casting of the second type (e.g., the pet image 720), it may not be required to reproduce the plurality of scenes in chronological order. For example, the controller 510 may determine sequence 1310 rearranged from sequence 1300, as a sequence of scenes for the live casting of the second type. On the basis of degrees of feedback (or types of feedback) of scene 1 1301 to scene 8 1308, the controller 510 may determine sequence 1310 rearranged from sequence 1300, as a sequence of scenes for the live casting of the second type. For example, the controller 510 may determine sequence 1310 in order from a scene (e.g., scene 7 1307) having a large number of feedback to a scene (e.g., scene 4 1304) having a small number of feedback. If the number of feedback (i.e., 5) included in scene 7 1307 and the number of feedback (i.e., 5) included in scene 3 1303 are the same, the controller 510 may determine sequence 1310 such that scene 7 1307 having a large number of positive feedback takes precedence.

Referring to FIG. 14, if the image type of the live casting is the third type or the fourth type, an operation of determining a sequence of scenes including feedback may be described. Operations of FIG. 14 may correspond to operation 1030 of FIG. 10.

Operation 1410 may be performed after the controller 510 extracts the scenes having feedback in operation 1010 of FIG. 10.

In operation 1410, the controller 510 may group a plurality of extracted scenes (i.e., scenes having feedback) into one or more sections. For example, one or more sections may be referred to as a first section, a second section, or a third section. Each of the one or more sections may include at least one scene.

In operation 1430, the controller 510 may determine a sequence of the scenes on the basis of a degree of feedback (or a type of feedback) within each of the one or more sections. The controller 510 may determine a sequence so that at least one scene included in the first section and at least one scene included in the second section are not mixed with each other.

For example, referring to FIG. 15, if the controller 510 determines the image type of the live casting to be the third type (e.g., the travel image 730), a method for determining a sequence of scenes having feedback may be described.

The controller 510 may determine (or extract) scenes having feedback from image data for the live casting of the third type (e.g., the travel image 730). Scene 1 1501, scene 2 1502, scene 3 1503, scene 4 1504, scene 5 1505, scene 6 1506, scene 7 1508, and scene 8 1208 may be scenes having feedback, which are extracted from a live casting image of the third type (e.g., the travel image 730).

Sequence 1500 may indicate an arrangement in chronological order of scene 1 1501 to scene 8 1508. The controller 510 may group scene 1 1501 to scene 8 1508 into the first section 1510, the second section 1520, and the third section 1530. For example, on the basis of location information of the first electronic device 201 that is live casting the travel image 730, the controller 510 may group scene 1 1501 to scene 8 1508 into the first section 1510, the second section 1520, and the third section 1530.

For example, the server 204 may transmit a signal indicating the third type to the first electronic device 201 in response to determining the image type of the live casting to be the third type (e.g., the travel image 730). The first electronic device 201 may acquire the location information of the first electronic device 201 via a GPS receiver in response to reception of the signal indicating the third type from the server 204. The first electronic device 201 may transmit the location information (e.g., a measurement value of the GPS receiver) of the first electronic device 201 to the server 204 at a designated period (or at each designated time). The server 204 may group image data, which is received from the first electronic device 201, into one or more sections on the basis of the location information received from the first electronic device 201.

The controller 510 may combine scene 1 1501, scene 2 1502, and scene 3 1503 in the extracted scenes, which are live-casted at a first place (e.g., Central park), into the first section 1510. The controller 510 may combine scene 4 1504, scene 5 1505, and scene 6 1506 in the extracted scenes, which are live-casted at a second place (e.g., MOMA), into the second section 1520. The controller 510 may combine scene 7 1507, and scene 8 1508 in the extracted scenes, which are live-casted at a third place (e.g., 5th AVE), into the third section 1530.

The controller 510 may determine sequence 1550 rearranged from sequence 1500, as a sequence of scenes for the live casting of the third type. The controller 510 may determine sequence 1550 on the basis of the degree of feedback (or the type of feedback) within each of the one or more sections (i.e., the first section 1510, the second section 1520, and the third section 1530). For example, the controller 510 may determine a sequence such that at least one scene (i.e., scene 1 1501, scene 2 1502, and scene 3 1503) included in the first section 1510 and at least one scene (i.e., scene 4 1504, scene 5 1505, and scene 6 1506) included in the second section 1520 are not mixed with each other.

For example, the controller 510 may determine, within the first section 1510, sequence 1550 in order from a scene (e.g., scene 3 1503) having a large number of feedback to a scene (e.g., scene 2 1502) having a small number of feedback. If the number of feedback (i.e., 2) included in scene 5 1505 and the number of feedback (i.e., 2) included in scene 4 1504 are the same in the second section 1520, the controller 510 may determine sequence 1550 such that scene 5 1505 having a large number of positive feedback takes precedence.

Referring to FIG. 16, if the controller 510 determines the image type of the live casting to be the fourth type (e.g., the shopping image 740), a method for determining a sequence of scenes having feedback may be described.

The controller 510 may determine (or extract) scenes having feedback from image data for the live casting of the fourth type (e.g., the shopping image 740). Scene 1 1601, scene 2 1602, scene 3 1603, scene 4 1604, scene 5 1605, scene 6 1606, scene 7 1607, and scene 8 1608 may be scenes having feedback, which are extracted from the live casting image of the fourth type (e.g., the shopping image 740).

Sequence 1600 may indicate an arrangement of scene 1 1601 to scene 8 1608 in chronological order. The controller 510 may group scene 1 1601 to scene 8 1608 into a first section 1610, a second section 1620, and a third section 1630. For example, on the basis of a gyro sensor value (or an acceleration sensor value) of the first electronic device 201 that is live casting the shopping image 740, the controller 510 may group scene 1 1601 to scene 8 1608 into the first section 1610, the second section 1620, and the third section 1630.

For example, the server 204 may transmit a signal indicating the fourth type to the first electronic device 201 in response to determining the image type of the live casting to be the fourth type (e.g., the shopping image 740). The first electronic device 201 may periodically acquire a gyro sensor value (or an acceleration sensor value) in response to reception of the signal indicating the fourth type from the server 204. The first electronic device 201 may transmit the gyro sensor value (or the acceleration sensor value) of the first electronic device 201 to the server 204 at a designated period (or at each designated time). The server 204 may group image data, which is received from the first electronic device 201, into one or more sections on the basis of the gyro sensor value (or the acceleration sensor value) received from the first electronic device 201. The controller 510 may group, into one section, frames which are photographed (or acquired) when the received gyro sensor value is smaller than a designated value (or a threshold value) or the received gyro sensor value is within a designated range (or a critical range).

The controller 510 may combine scene 1 1601, scene 2 1602, and scene 3 1603 in the extracted scenes, which are live-casted at a first sub-place (e.g., a shoe store), into the first section 1610. The controller 510 may combine scene 4 1604, scene 5 1605, and scene 6 1606 in the extracted scenes, which are live-casted at a second sub-place (e.g., a bag store next to the shoe store), into the second section 1620. The controller 510 may combine scene 7 1607, and scene 8 1608 in the extracted scenes, which are live-casted at a third sub-place (e.g., a clothing store next to the shoe store and the bag store), into the third section 1630.

The controller 510 may determine sequence 1650 rearranged from sequence 1600, as a sequence of scenes for the live casting of the fourth type. The controller 510 may determine sequence 1650 on the basis of the degree of feedback (or the type of feedback) within each of the one or more sections (i.e., the first section 1610, the second section 1620, and the third section 1630). For example, the controller 510 may determine, within the first section 1610, sequence 1650 in order from a scene (e.g., scene 3 1603) having a large number of feedback to a scene (e.g., scene 1 1601) having a small number of feedback.

In operation 1430, in response to determining the sequence by the controller 510 on the basis of the degree of feedback (or the type of feedback) within each section, operation 1050 of FIG. 10 may be performed.

In operation 1050, on the basis of the determined sequence and a user characteristic (or a user preference), the controller 510 may generate summary image data for each of the plurality of electronic devices (e.g., the first electronic device 201, the second electronic device 202, or the third electronic device 203). Detailed descriptions of an operation of generating summary image data on the basis of a sequence and a user characteristic will be described later with reference to FIG. 17 to FIG. 19.

In response to generating the summary image data by the controller 510 in operation 1050, operation 660 of FIG. 6 may be performed.

Figure 17:
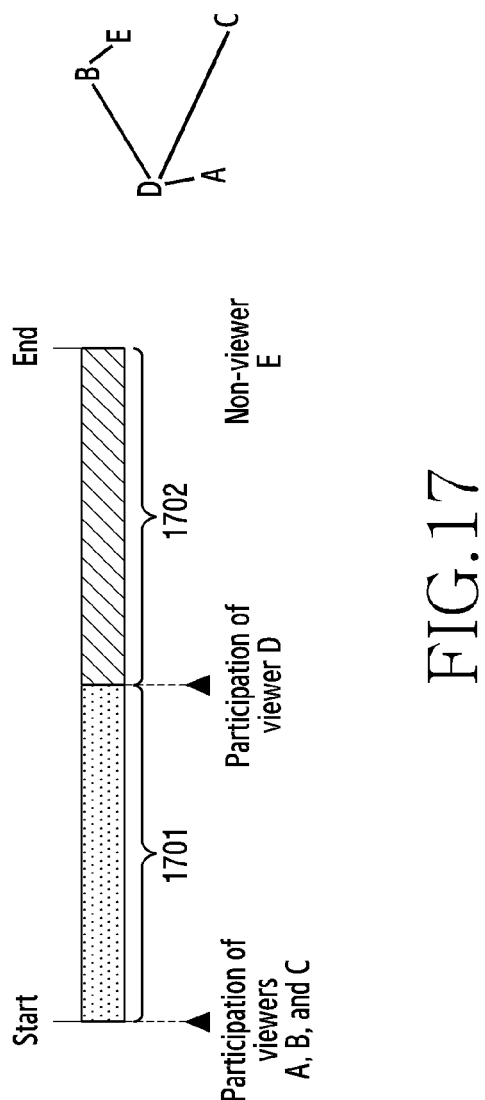
FIG. 17 illustrates an example of a method for generating summary image data on the basis of a user characteristic by the server according to various embodiments.

FIG. 17 illustrates an example of a method for generating summary image data on the basis of a user characteristic by the server 204 according to various embodiments.

Referring to FIG. 17, an example of a method for generating, by the controller 510, a plurality of image data for the plurality of electronic devices (e.g., A, B, C, D, and E) respectively may various embodiments described. The controller 510 may identify (or determine) user characteristics of A, B, C, D, and E by using the database stored in the storage unit 550. The user characteristics may indicate affinity between the plurality of electronic devices (e.g., A, B, C, D, and E).

In some embodiments, with respect to each electronic device (i.e., each ID), the controller 510 may determine that each electronic device (i.e., each ID) itself has a highest affinity. For example, the controller 510 may determine that A has the highest affinity for A. Accordingly, the controller 510 may generate summary image data for A at least on the basis of feedback of A.

In some embodiments, the controller 510 may identify affinity between the plurality of electronic devices (i.e., a plurality of IDs) by using a bookmark function provided via the messenger application. For example, the controller 510 may store, in the storage unit 550, bookmark information that is input via the messenger application installed in each electronic device. The controller 510 may determine an ID having a high affinity for each ID by using the bookmark information. For example, if user E (i.e., a user of E) stores an ID of user B as a bookmark via the messenger application, the controller 510 may determine that E has a high affinity for B. Accordingly, the controller 510 may generate summary image data for E at least on the basis of feedback of E.

In some embodiments, the controller 510 may identify affinity between the plurality of electronic devices (i.e., a plurality of IDs) on the basis of feedback data stored in the database. For example, the controller 510 may determine, during the live casting, that A and D have a higher affinity with each other when feedback received from A and feedback received from D are more similar. For example, the controller 510 may determine, during the live casting, that A and D have a high affinity with each other, if a frame received from A and a frame received from D are within the same distance or a designated distance. The controller 510 may store feedback data for A and D or affinity information for A and D even after the live casting is terminated.

In various embodiments, the controller 510 may generate summary image data for each of the plurality of electronic devices (e.g., A, B, C, D, and E) on the basis of user characteristics of the plurality of electronic devices. For example, user characteristics of the plurality of electronic devices may indicate not only affinity between the plurality of electronic devices but also whether the plurality of electronic devices have participated in the live casting. The controller 510 may generate a plurality of summary images by using the affinity between the plurality of electronic devices, on the basis of whether the electronic devices have participated in the live casting.

A, B, and C may be electronic devices having participated in the entire live casting from the initiation of the live casting to the termination of the live casting. E may be an electronic device (i.e., the third electronic device 203) that has not participated in the live casting until the termination of the live casting. D may be an electronic device that has participated in only a part of the entire live casting.

For example, summary image data for A having participated in the live casting from the beginning may be generated based on feedback of A that has a highest affinity for A. The controller 510 may generate the summary image data for A having participated in the live casting from the beginning on the basis of the feedback of A.

For example, summary image data for E that has not participated in the live casting may be generated based on feedback of B that has a next highest affinity for E. The controller 510 may generate the summary image data for E that has not participated in the live casting, on the basis of the feedback of B.

For example, D may be participated in the live casting in the middle of the same. In order to generate the summary image data for D, the controller 510 may use the feedback of A having the next highest affinity for D with respect to an image section 1701 in which D has not participated, and may use the feedback of D having the highest affinity for D with respect to an image section 1702 in which D has participated.

For example, in a case where C is a broadcaster electronic device (i.e., the first electronic device 201), feedback of all participants may be important to C. Therefore, summary image data for C may be generated based on feedback of all participants (e.g., A, B, C, D, and E). The controller 510 may generate the summary image data for C that is the broadcaster electronic device, on the basis of the feedback of all participants.

Figure 18:
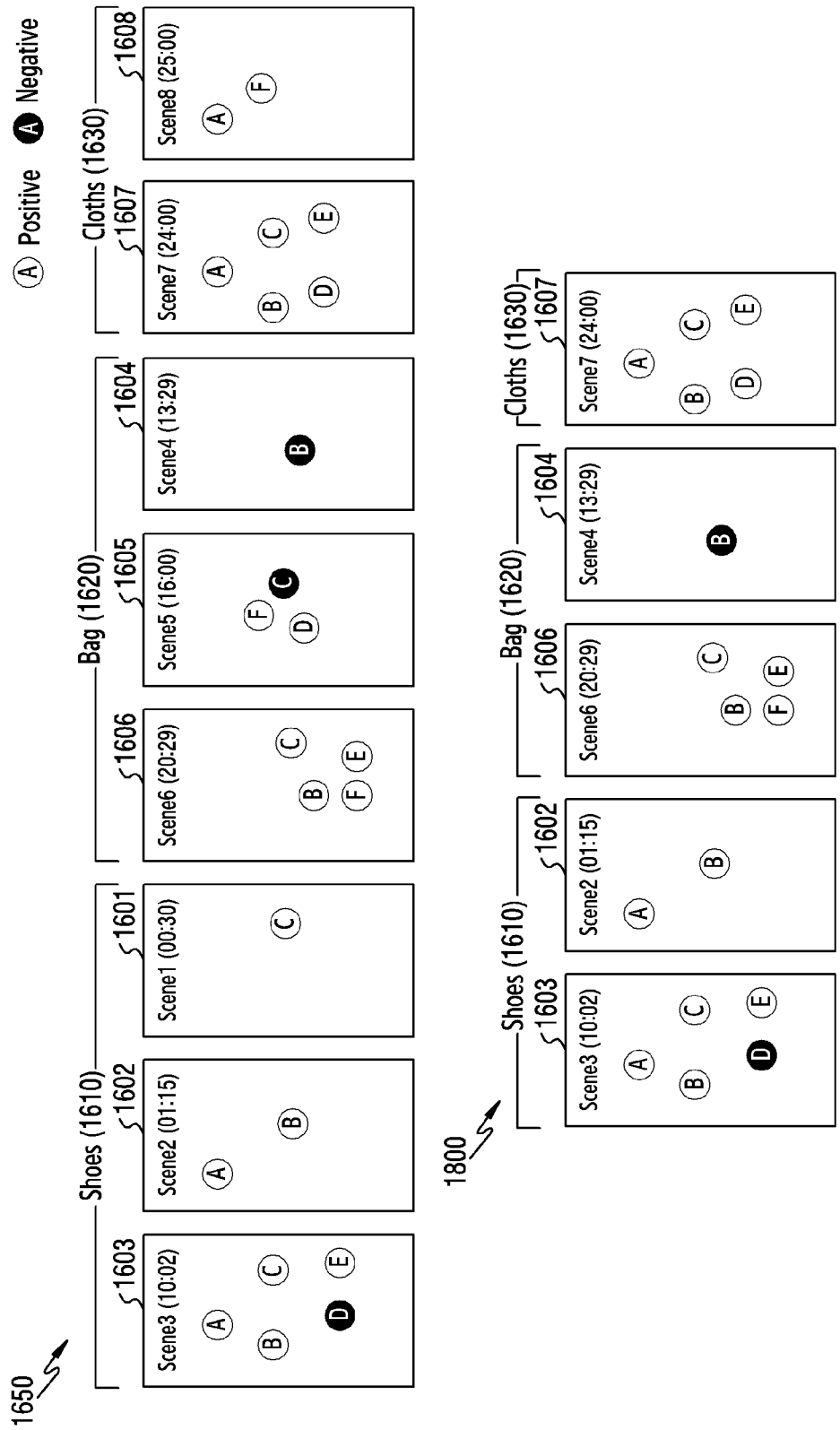
FIG. 18 illustrates an example of a summary image generated on the basis of a user characteristic according to various embodiments.
Figure 19:
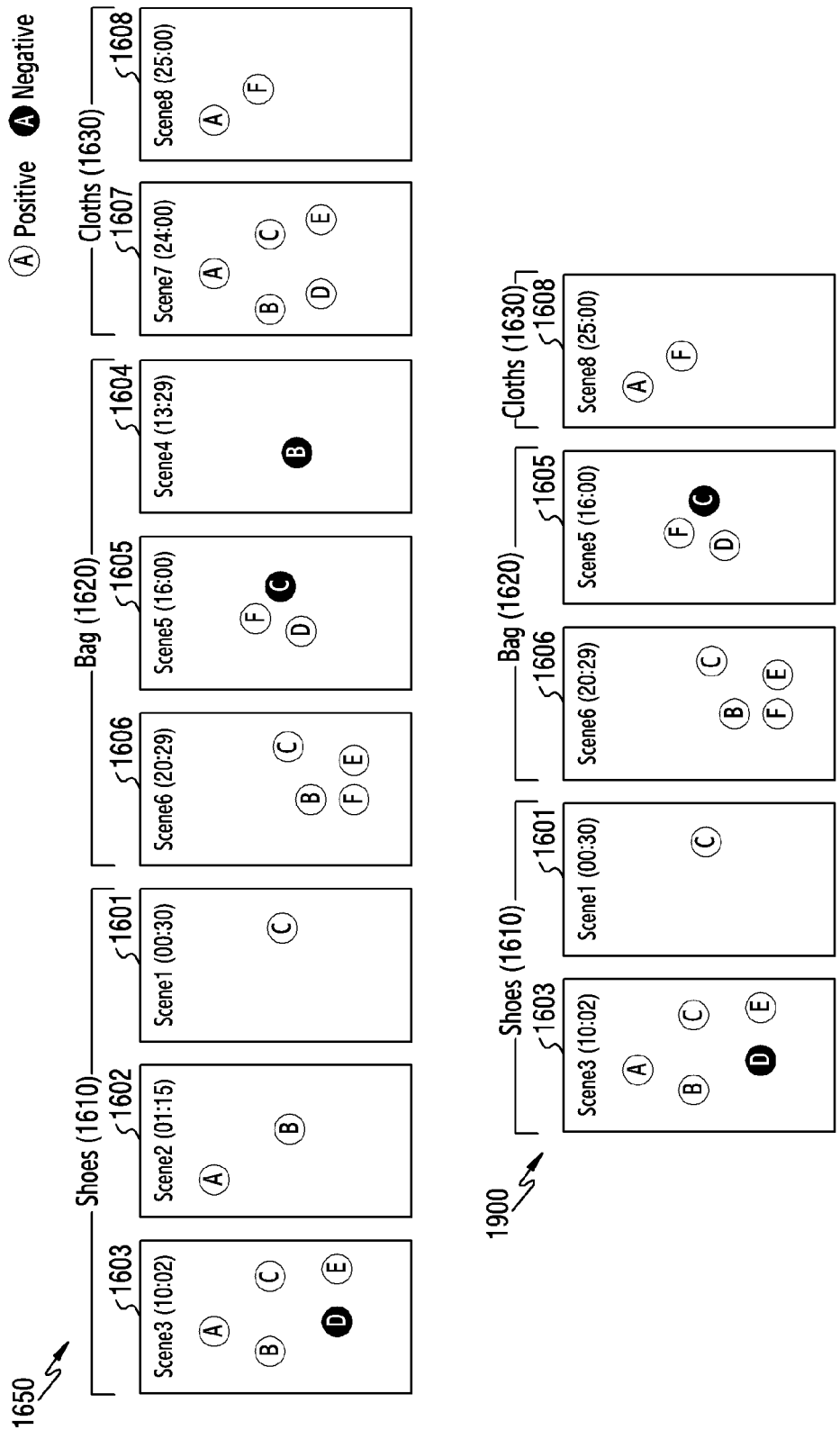
FIG. 19 illustrates another example of a summary image generated on the basis of a user characteristic according to various embodiments.

Hereinafter, in FIG. 18 and FIG. 19, an example of a method for generating summary image data on the basis of a user characteristic from the determined sequence 1650 may be described with reference to FIG. 16. In FIG. 18 and FIG. 19, an example of summary image data generated based on the sequence 1650 determined from the live casting of the fourth type (e.g., the shopping image 740), is illustrated, but is not limited thereto.

FIG. 18 illustrates an example of a summary image generated on the basis of a user characteristic according to various embodiments.

Referring to FIG. 18, an example of a summary image for an electronic device (e.g., B) having participated in the live casting from the beginning and an example of an electronic device (e.g., G, not illustrated) that has not participated in the live casting may be described.

For example, the summary image for B having participated in the live casting from the beginning may be generated based on feedback of B itself that has the highest affinity for B. In order to generate the summary image (or partial image) for B, the controller 510 may extract (or determine) scenes (i.e., scene 3 1603, scene 2 1602, scene 6 1606, scene 4 1604, and scene 7 1607) including the feedback of B from the sequence 1650. The controller 510 may determine, as the summary image for B, a summary image 1800 in which the extracted scenes are arranged in order based on the sequence 1650.

Summary image data for G that has not participated in the live casting may be generated based on feedback of an electronic device having the next highest affinity after G with respect to G. For example, if the electronic device having the next highest affinity after G with respect to G is B, a summary image for G may correspond to the summary image 1800 for B.

FIG. 19 illustrates another example of a summary image generated on the basis of a user characteristic according to various embodiments.

Referring to FIG. 19, an example of a summary image for an electronic device (e.g., F) having participated in the live casting in the middle of same may be described. F may not be participating in scene 1 1601, scene 2 1602, scene 3 1603, and scene 4 1604, and F may be participating in scene 5 1605, scene 6 1606, scene 7 1607, and scene 8 1608. That is, F may be an electronic device having participated in the live casting after scene 4 and before scene 5. F may participate in the live casting between 13 minutes 29 seconds and 16 minutes after the initiation of the live casting. For example, an electronic device having the next highest affinity after F with respect to F may be C.

In order to generate a summary image (or partial image) for F, the controller 510 may extract scenes (i.e., scene 3 1603 and scene 1 1601) including the feedback of C from scenes (i.e., scene 3 1603, scene 2 1602, scene 1 1601, and scene 4 1604), in which F has not participated, in the sequence 1650. In order to generate the summary image for F, the controller 510 may extract scenes (e.g., scene 6 1601, scene 5 1605, and scene 8 1608) including the feedback of F from scenes (i.e., scene 6 1606, scene 5 1605, scene 7 1607, and scene 8 1608) in which F has participated, in the sequence 1650.

The controller 510 may determine, as the summary image for F, a summary image 1900 in which the extracted scenes are arranged in order based on the sequence 1650.

Figure 20:
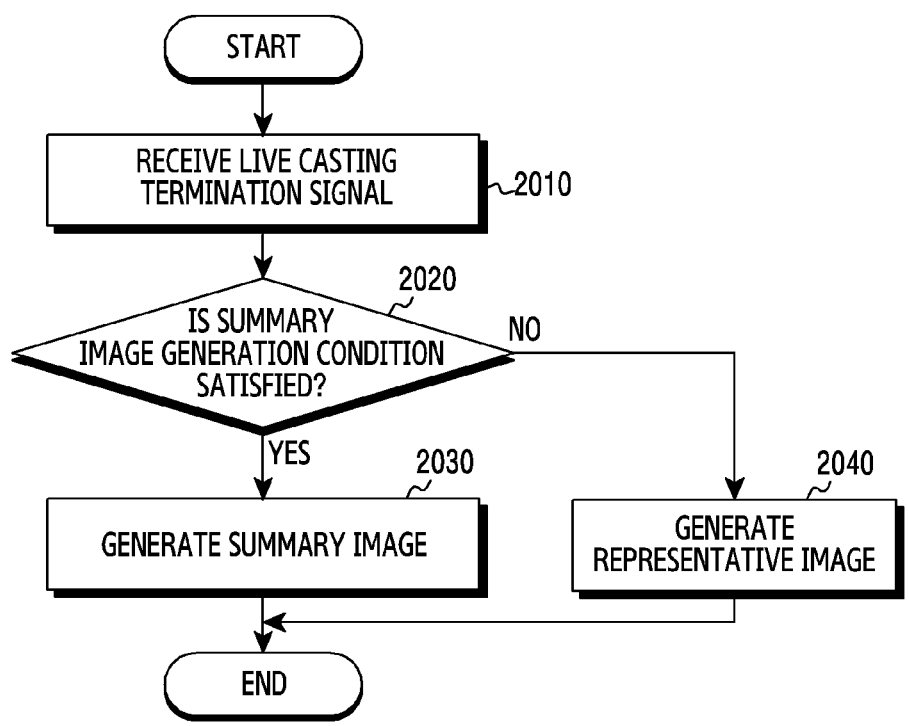
FIG. 20 illustrates an example of an operation of generating one of a summary image or a representative image by the server according to various embodiments.

FIG. 20 illustrates an example of an operation of generating one of a summary image or a representative image by the server 204 according to various embodiments.

Referring to FIG. 20, in operation 2010, the controller 510 may receive a live casting termination signal via the communication unit 530 from the first electronic device 201. Operation 2010 may correspond to operation 318 of FIG. 3.

In operation 2020, the controller 510 may determine whether a live casting image satisfies a summary image generation condition.

For example, if a reproduction time of the live casting is shorter than a designated time (e.g., 5 sections), the controller 510 may generate a representative image without generating a summary image. As another example, during relay of the live casting, if the number of feedback received from one or more second electronic devices 202 is less than a designated number, the controller 510 may generate a representative image without generating a summary image. As still another example, if a difference between a reproduction time of the live casting and a reproduction time of a summary image is smaller than a designated value, the controller 510 may generate a representative image.

For example, if all of the above conditions are not met, the controller 510 may determine that the summary image generation condition is satisfied.

In operation 2030, the controller 510 may generate a summary image if the live casting image satisfies the summary image generation condition.

In operation 2040, the controller 510 may generate a representative image if the live casting image does not satisfy the summary image generation condition. For example, if the live casting image does not satisfy the summary image condition, the controller 510 may generate a representative image according to the method described in FIG. 11.

Figure 21:
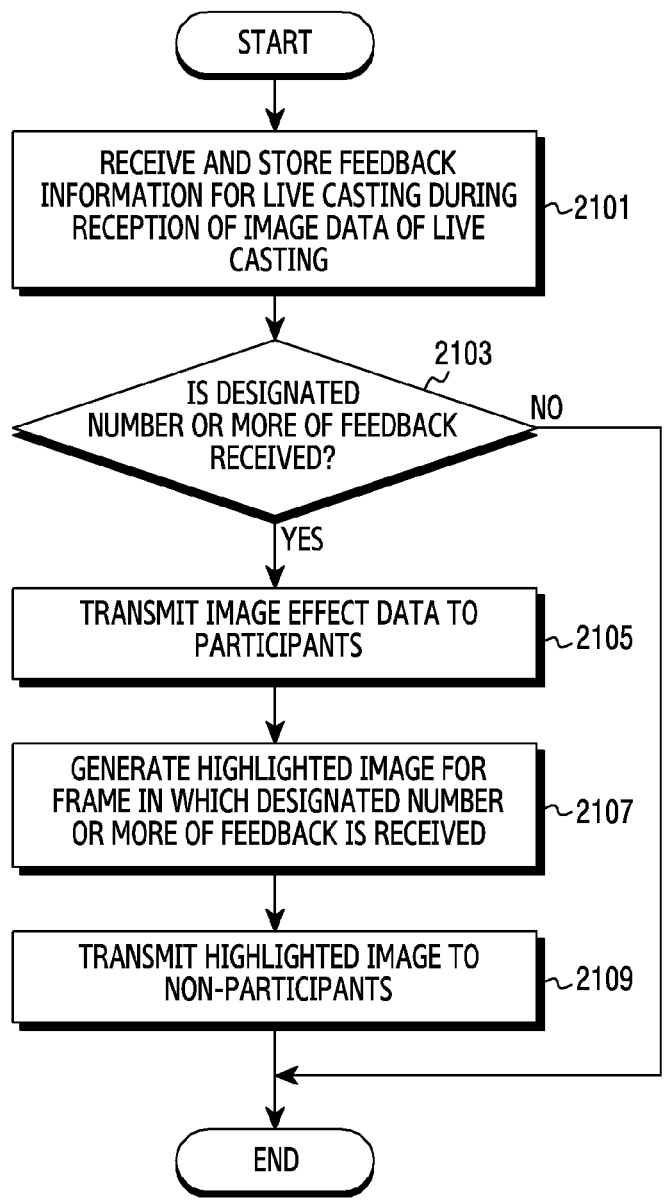
FIG. 21 illustrates an example of an operation of generating a highlighted image by the server according to various embodiments.

FIG. 21 illustrates an example of an operation of generating a highlight image by the server according to various embodiments.

Figure 22:
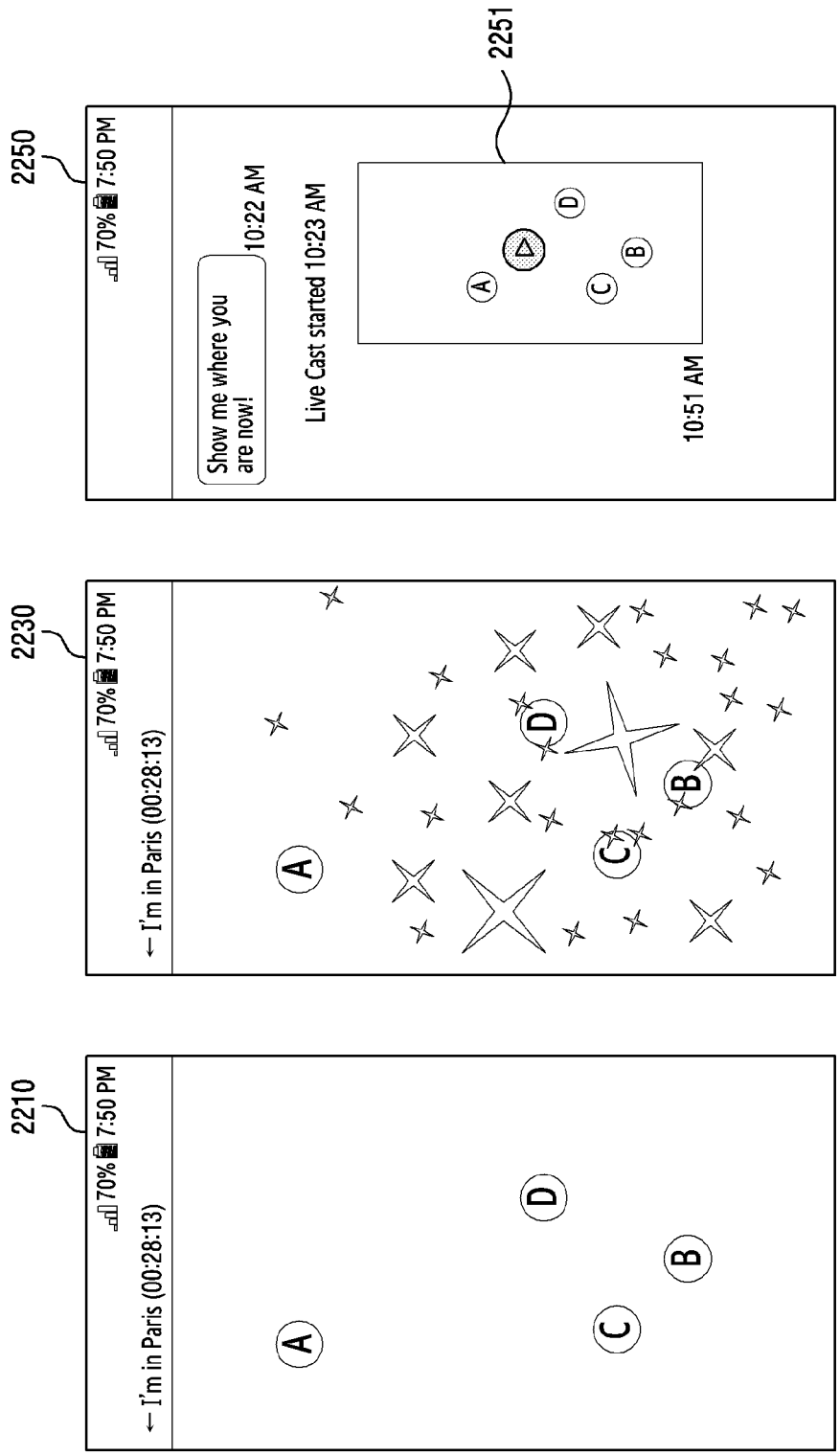
FIG. 22 illustrates an example of a screen displayed by at least one of the first electronic device, the second electronic device, and the third electronic device according to various embodiments.

FIG. 22 illustrates an example of a screen displayed by at least one of the first electronic device 201, the second electronic device 202, and the third electronic device 203 according to various embodiments.

Referring to FIG. 21, in operation 2101, while image data of live casting is being received from the first electronic device 201, the controller 510 may receive feedback information for the live casting from the first electronic device 201 and/or the second electronic device 202. The feedback information may indicate information related to feedback that is input via the first electronic device 201 and/or the second electronic device 202. For example, the feedback information may correspond to information included in the database 900 of FIG. 9. The controller 510 may store the receive feedback information for the live casting. Operation 2101 may correspond to operation 640 of FIG. 6.

In operation 2103, the controller 510 may determine whether a designated number or more of feedback is received. For example, the controller 510 may determine, via one frame, whether feedback is received from all electronic devices of a plurality of participants. As another example, the controller 510 may determine, via one frame, whether the designated number or more of feedback is received from the electronic devices of the plurality of participants. As another example, the controller 510 may determine, via a designated number of consecutive frames, whether the designated number or more of feedback is received from the electronic devices of the plurality of participants.

For example, referring to FIG. 22, a screen 2210 may indicate a frame in which the designated number or more of feedback is received. The screen 2210 may indicate a frame in which feedback is received from the plurality of electronic devices (i.e., A, B, C, and D).

In operation 2103, the controller 510 may terminate operation if the designated number or more of feedback is not received. For example, returning to operation 2101, until the termination of the live casting, the controller 510 may receive image data of the live casting from the first electronic device 201, and may receive feedback data for the live casting from the second electronic device 202.

If the designated number or more feedback is received, the controller 510 may transmit image effect data to participants of the live casting, in operation 2105. For example, the controller 510 may transmit a highlight effect, which indicates that the designated number or more of feedback has been received, to the first electronic device 201 and one or more second electronic devices 202. The first electronic device 201 and one or more second electronic devices 202 may superimpose and display, on the live casting image, the image effect (e.g., the highlight effect) received from the server 204. For example, referring to FIG. 22, the first electronic device 201 and one or more second electronic devices 202 may display a screen 2230 in which the image effect (e.g., the highlight effect) is superimposed on the live casting image.

In operation 2107, the controller 510 may generate a highlighted image including a frame in which the designated number or more of feedback is received. For example, the controller 510 may generate a highlighted image for transmission to the third electronic device 203, in parallel with relaying the live casting between the first electronic device 201 and the second electronic device 202. The highlighted image may be transmitted to the third electronic device 203 which is included in the chat group 210 but does not participate in the live casting.

In operation 2109, the controller 510 may transmit the highlighted image to the third electronic device 203 via the communication unit 530. For example, the controller 510 may transmit the highlighted image to the third electronic device 203 via a messenger application. For example, referring to FIG. 22, a screen 2250 may indicate a chat window of the third electronic device 203 having received the highlighted image from the server 204. The screen 2250 may include an object 2251 indicating the highlighted image. The third electronic device 203 may reproduce the highlighted image if an input for the object 2251 is detected. The highlighted image may be a moving image.

Operation 2101 to operation 2109 may be performed in parallel while operation 307 to operation 316 of FIG. 3 are being performed (i.e., the live casting is being performed).

An operation method of an electronic device (e.g., the server 204) according to the described various embodiments may include: while an image received from a first electronic device (e.g., the first electronic device 201) is being transmitted to one or more second electronic devices (e.g., the second electronic device 202) so as to be displayed by the one or more second electronic devices, receiving data relating to feedback on the image from the one or more second electronic devices; on the basis of the data relating to the feedback, generating partial images for the one or more second electronic devices from the image; and providing the one or more second electronic devices with the partial images as images corresponding to preferences of users related to the one or more second electronic devices.

In various embodiments, the method may further include: receiving text related to the image from at least one of the first electronic device or the one or more second electronic devices; determining a type of the image on the basis of the text; and generating the partial images on the basis of the data on feedback and the type of the image.

In various embodiments, the image may include a plurality of frames, and generating of the partial image may include: determining one or more frames corresponding to a point in time at which the data relating to feedback is received, from among the plurality of frames; and generating the partial images including at least a part of the one or more frames. For example, the method may further include: determining a sequence of the determined one or more frames on the basis of the determined image type; and generating the partial images on the basis of the sequence.

In various embodiments, the method may further include: receiving, from the first electronic device, information relating to a location of the first electronic device while receiving the image from the first electronic device; and generating the partial images on the basis of the location of the first electronic device.

In various embodiments, providing of the partial images as images corresponding to the preferences of users related to the one or more second electronic devices may include: receiving, from the one or more second electronic devices, information relating to preferences of the one or more respective second electronic devices; and generating partial images for the one or more respective second electronic devices on the basis of the preferences of the one or more respective second electronic devices.

In various embodiments, the method may further include: generating a representative image for the image on the basis of at least one of a case where the number of the data relating to the received feedback is fewer than a designated number or a case where a length of the image is shorter than a designated length; and transmitting the representative image to the one or more second electronic devices.

In various embodiments, the method may further include transmitting, in response to reception of the designated number or more of data relating to feedback during a designated time period, data relating to enhancement effects on the image, which is to be displayed in one or more second electronic devices, to the one or more second electronic devices.

In various embodiments, the method may further include transmitting at least a part of the image to a third electronic device that does not receive the image, in response to reception of the designated number or more of data relating to feedback during a designated time period.

In the detailed description of the disclosure, specific embodiments have been described, but various modifications are possible without departing from the scope of the disclosure. Therefore, the scope of the disclosure should not be limited to the described embodiments, but should be determined not only by the scope of the claims described below, but also by equivalents to the scope of the claims.

The invention claimed is:

1. An electronic device comprising:
a communication unit; and
a controller, wherein the controller is configured to:
while an image received from a first electronic device is being transmitted to one or more second electronic devices so as to be displayed by the one or more second electronic devices, receive data relating to feedback on the image from the one or more second electronic devices via the communication unit, wherein the image comprises a plurality of frames and wherein the data relating to feedback is data regarding a feedback input detected on a touch screen of the one or more second electronic devices while the image is displayed on the touch screen of the one or more second electronic devices;
store the data relating to the feedback in association with frame information of a frame from which the feedback input is detected among the plurality of frames, coordinate information at which the feedback input is detected within a frame, and information relating to a type of the feedback input;
based on the data relating to the feedback, determine one or more frames corresponding to a point in time at which the data relating to the feedback is received, from among the plurality of frames;
based on a type of the image, determine a sequence of the one or more frames to compose partial images;
based on the sequence, generate the partial images from the one or more frames; and
provide the one or more second electronic devices with the partial images as images corresponding to preferences of users related to the one or more second electronic devices.

2. The electronic device of claim 1, wherein the controller is configured to:
receive text related to the image from at least one of the first electronic device or the one or more second electronic devices; and
determine the type of the image based on the text.

3. The electronic device of claim 1, wherein the controller is configured to:
while the image is being received from the first electronic device, receive information relating to a location of the first electronic device from the first electronic device; and
generate the partial images based on the location of the first electronic device.

4. The electronic device of claim 1, wherein the controller is configured to:
receive information relating to a preference of each of the one or more second electronic devices from the one or more second electronic devices; and
based on the preference of each of the one or more second electronic devices, generate a partial image for each of the one or more second electronic devices.

5. The electronic device of claim 1, wherein the controller is configured to:
based on at least one of a case in which a number of the data relating to the feedback is less than a designated number or a case in which a length of the image is shorter than a designated length, generate a representative image for the image; and
transmit the representative image to the one or more second electronic devices.

6. The electronic device of claim 1, wherein the controller is configured to:
in response to reception of a designated number or more of the data relating to the feedback during a designated time, transmit data relating to an enhancement effect on the image, which is to be displayed in the one or more second electronic devices, to the one or more second electronic devices; and
transmit at least a part of the image to a third electronic device that does not receive the image.

7. A method of an electronic device, the method comprising:
while an image received from a first electronic device is being transmitted to one or more second electronic devices so as to be displayed by the one or more second electronic devices, receiving data relating to feedback on the image from the one or more second electronic devices, wherein the image comprises a plurality of frames and wherein the data relating to feedback is data regarding a feedback input detected on a touch screen of the one or more second electronic devices while the image is displayed on the touch screen of the one or more second electronic device;
storing the data relating to the feedback in association with frame information of a frame from which the feedback input is detected among the plurality of frames, coordinate information at which the feedback input is detected within a frame, and information relating to a type of the feedback input;
based on the data relating to the feedback, determining one or more frames corresponding to a point in time at which the data relating to the feedback is received, from among the plurality of frames;
based on a type of the image, determining a sequence of the one or more frames to compose partial images;
based on the sequence, generating the partial images from the one or more frames; and
providing the one or more second electronic devices with the partial images as images corresponding to preferences of users related to the one or more second electronic devices.

8. The method of claim 7, further comprising:
receiving text related to the image from at least one of the first electronic device or the one or more second electronic devices; and
determining the type of the image based on the text.

9. The method of claim 7, further comprising:
while the image is being received from the first electronic device, receiving information relating to a location of the first electronic device from the first electronic device; and
generating the partial images based on the location of the first electronic device.

10. The method of claim 7, wherein the providing of the partial images as images corresponding to preferences of users related to the one or more second electronic devices comprises:
receiving information relating to a preference of each of the one or more second electronic devices from the one or more second electronic devices; and
based on the preference of each of the one or more second electronic devices, generating a partial image for each of the one or more second electronic devices.

11. The method of claim 7, further comprising:
based on at least one of a case in which a number of the data relating to the feedback is less than a designated number or a case in which a length of the image is shorter than a designated length, generating a representative image for the image; and
transmitting the representative image to the one or more second electronic devices.

12. The method of claim 7, further comprising:
in response to reception of a designated number or more of the data relating to the feedback during a designated time, transmitting data relating to an enhancement effect on the image, which is to be displayed in the one or more second electronic devices, to the one or more second electronic devices; and
transmitting at least a part of the image to a third electronic device that does not receive the image.

* * * * *